(12) United States Patent
Ye et al.

(10) Patent No.: US 9,014,280 B2
(45) Date of Patent: Apr. 21, 2015

(54) VIDEO CODING WITH ADAPTIVE FILTERING FOR MOTION COMPENSATED PREDICTION

(75) Inventors: Yan Ye, San Diego, CA (US); Yiliang Bao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1067 days.

(21) Appl. No.: 11/869,062

(22) Filed: Oct. 9, 2007

(65) Prior Publication Data

US 2008/0089417 A1    Apr. 17, 2008

Related U.S. Application Data

(60) Provisional application No. 60/829,494, filed on Oct. 13, 2006, provisional application No. 60/938,151, filed on May 15, 2007.

(51) Int. Cl.
*H04N 19/523* (2014.01)
*H04N 19/176* (2014.01)
(Continued)

(52) U.S. Cl.
CPC .......... *H04N 19/523* (2014.11); *H04N 19/176* (2014.11); *H04N 19/172* (2014.11);
(Continued)

(58) Field of Classification Search
CPC ... H04N 19/117; H04N 19/14; H04N 19/172; H04N 19/174; H04N 19/176; H04N 19/187; H04N 19/46; H04N 19/523; H04N 19/61; H04N 19/82
USPC .................................................... 375/240.29
See application file for complete search history.

(56) References Cited

U.S. PATENT DOCUMENTS 5,126,841 A * 6/1992 Tanaka et al. ............ 375/240.16
5,579,051 A   11/1996 Murakami et al.
(Continued)

FOREIGN PATENT DOCUMENTS

EP   1404136    3/2004
JP   5244585 A  9/1993
(Continued)

OTHER PUBLICATIONS

ITU-T Recommendation H.264. Advanced Video Coding for Generic Audiovisual Services. Section 8.4. Mar. 2005.
(Continued)

*Primary Examiner* — Huy D Vu
*Assistant Examiner* — Stephen J Clawson
(74) *Attorney, Agent, or Firm* — Timothy E. Buckley; Elaine H. Lo

(57) ABSTRACT

This disclosure is directed to video coding techniques that support normal single layer video coding, or scalable video coding with features such as signal-to-noise ratio (SNR) scalability and spatial scalability. A video coding device may implement these techniques in a video decoder that includes a motion compensation module and a filter. The motion compensation module decodes a prediction frame from a digital video signal, wherein the motion compensation module determines each block of the inter-coded frame from motion vectors encoded in the digital video signal. The filter adaptively filters one or more of the inter-coded blocks based on a signal either encoded or inferred from the digital video signal. In some instances, the video decoder may adaptively apply different filter functions, one in the horizontal and another in the vertical direction, based on the signal. By implementing these techniques, the video decoder may increase the visual quality of the resulting decoded digital video signal while reducing complexity.

25 Claims, 13 Drawing Sheets

(51) Int. Cl.
*H04N 19/172* (2014.01)
*H04N 19/46* (2014.01)
*H04N 19/61* (2014.01)
*H04N 19/117* (2014.01)
*H04N 19/14* (2014.01)
*H04N 19/174* (2014.01)
*H04N 19/187* (2014.01)
*H04N 19/82* (2014.01)

(52) U.S. Cl.
CPC .............. *H04N 19/46* (2014.11); *H04N 19/61* (2014.11); *H04N 19/117* (2014.11); *H04N 19/14* (2014.11); *H04N 19/174* (2014.11); *H04N 19/187* (2014.11); *H04N 19/82* (2014.11)

(56) References Cited

U.S. PATENT DOCUMENTS

| | | | |
|---|---|---|---|
| 6,037,986 A * | 3/2000 | Zhang et al. | 375/240.12 |
| 6,192,079 B1 | 2/2001 | Sharma et al. | |
| 2001/0024470 A1* | 9/2001 | Radha et al. | 375/240.1 |
| 2003/0190086 A1* | 10/2003 | Kim | 382/275 |
| 2003/0235248 A1* | 12/2003 | Kim et al. | 375/240.12 |
| 2004/0032908 A1 | 2/2004 | Hagai et al. | |
| 2004/0076333 A1* | 4/2004 | Zhang et al. | 382/238 |
| 2006/0023794 A1* | 2/2006 | Wan et al. | 375/240.29 |
| 2006/0062298 A1 | 3/2006 | Park et al. | |
| 2006/0203910 A1 | 9/2006 | Kitada et al. | |

FOREIGN PATENT DOCUMENTS

| | | |
|---|---|---|
| JP | 6311506 A | 11/1994 |
| JP | H09187008 A | 7/1997 |
| JP | 2001204029 A | 7/2001 |
| JP | 2003179933 A | 6/2003 |
| JP | 2003319398 A | 11/2003 |
| JP | 2005312072 A | 11/2005 |
| JP | 2006129436 | 5/2006 |
| JP | 2006254320 A | 9/2006 |
| JP | 2009532584 A | 9/2009 |
| WO | WO2005099275 A2 | 10/2005 |

OTHER PUBLICATIONS

Woo-Jin Han. "Modified IntraBL Design Using Smoothed Reference." JVT-R091r1. Jan. 2006, Bangkok, Thailand.
Yey.: Bao Y.: "Complexity Reduction for Smoothed Reference used in Spatial Scalability" Video Standards and Drafts, XX.XX, No. JVT-U126rl, Dec. 20, 2006. XP030006772.
Pang K. K. et al.: "Optimum Loop Filter in Hybrid Coders" IEEE Transaction on Circuits and Systems for Video Technology, IEEE Service Center, Piscataway, NJ, US, vol. 4, No. 2, Apr. 1, 1994, pp. 158-167, XP000489688, ISSN: 1051-8215.
Schwarz H. et al.: "Constrained Inter-Layer Prediction for Single-Loop Decoding in Spatial Scalability" Image Processing, 2005. ICIP 2005, IEEE International Conference on Genova, Italy Sep. 11-14, 2005, Piscataway, NJ, USA, IEEE, vol. 2. pp. 870-873, X.
W.-J. Han: "Smoothed reference prediction for single-loop decoding" Video Standards and Drafts. XX.XX, No. JVT-P085, Jul. 19, 2005, XP030006122.
International Preliminary Report on Patentability—PCT/US07/081145, International Search Authority—European Patent Office—Jan. 22, 2009.
International Search Report—PCT/US07/081145, International Search Authority—European Patent Office—Jun. 16, 2008.
Written Opinion—PCT/US07/081145, International Search Authority—European Patent Office—Jun. 16, 2008.
Thomas, Wiegand et al., "Joint Draft 7 of SVC Amendment (revision 2)", JVT-T201r2, Jul. 2006, pp. 1-540 Klagenfurt, Austria.
TIA-1099 Standard "Forward Link Only Air Interface Specification for Terrestrial Mobile Multimedia Multicast" pp. 1-341, Mar. 2007.
Khee K. et al., "Optimal Loop Filter in Hybrid Coders," IEEE Transactions on Circuits and Systems for Video Technology, vol. 4, No. 2, pp. 158-167, Apr. 1994.
Taiwan Search Report—TW096138321—TIPO—Mar. 18, 2011.
Taiwan Search Report—TW096138321—TIPO—Mar. 20, 2012.

* cited by examiner

A  B  C d a  D e b  E f c  F  G  H

FIG. 9

VIDEO CODING WITH ADAPTIVE FILTERING FOR MOTION COMPENSATED PREDICTION

This application claims the benefit of U.S. Provisional Application No. 60/829,494, filed Oct. 13, 2006, and U.S. Provisional Application No. 60/938,151, filed May 15, 2007, the entire content of each of which is incorporated herein by reference.

TECHNICAL FIELD

This disclosure relates to digital video and, more particularly, coding of digital video.

BACKGROUND

Digital video capabilities can be incorporated into a wide range of devices, including digital televisions, digital direct broadcast systems, wireless communication devices, personal digital assistants (PDAs), laptop computers, desktop computers, digital cameras, digital recording devices, video gaming devices, cellular or satellite radio telephones, and the like. Digital video devices typically implement a video compression technique, such as MPEG-2, MPEG-4, or H.264/MPEG-4, Part 10 (Advanced Video Coding (AVC)), in order to transmit and receive digital video signals more efficiently. Video compression techniques perform spatial and temporal prediction to reduce or remove redundancy inherent in video signals. Scalable video coding techniques enable additional features such as spatial, temporal and/or signal-to-noise ratio (SNR) scalability, via a base layer and one or more enhancement layers.

In video coding, video compression generally includes motion estimation and motion compensation. Motion estimation tracks the movement of video objects between successive video frames. Motion estimation generates motion vectors, which indicate the displacement of video blocks relative to corresponding video blocks in one or more reference frames. Motion compensation uses the motion vector to generate a prediction video block from one or more reference frames. In addition, motion compensation forms a residual video block by subtracting the prediction video block from the original video block. The video encoder applies transform, quantization and entropy coding processes to further reduce the bit rate of the residual block. A video decoder performs inverse operations to reconstruct the encoded video, using the motion vectors and residual information for each of the blocks.

SUMMARY

In general, the disclosure is directed to video coding techniques that support adaptive filtering of motion compensated prediction blocks in a video decoder. Adaptive filtering of motion compensated prediction blocks may be applied to promote prediction accuracy. Additionally, or alternatively, adaptive filtering may be applied to reduce complexity.

In one aspect, the disclosure provides a video coding device comprising a motion compensation module that applies motion compensation to blocks within a video frame to generate prediction video blocks, and a control module that adaptively adjusts the motion compensation to apply either a first filter mode or a second filter mode to each of the blocks based on a filter mode decision.

In another aspect, the disclosure provides a method comprising applying motion compensation to blocks within a video frame to generate prediction video blocks, and adaptively adjusting the motion compensation to apply either a first filter mode or a second filter mode to each of the blocks based on a filter mode decision.

In a further aspect, the disclosure provides a video coding device comprising a motion compensation module that performs motion compensation on blocks within a video frame to generate video blocks, wherein the motion compensation module includes a filter, and the motion compensation module applies the filter to the blocks for motion vectors that point to integer pixel locations.

In an additional aspect, the disclosure provides an integrated circuit device comprising a motion compensation module that applies motion compensation to blocks within a video frame to generate prediction video blocks, and a control module that adaptively adjusts the motion compensation to apply either a first filter mode or a second filter mode to each of the blocks based on a filter mode decision.

In another aspect, the disclosure provides a wireless communication device handset comprising a motion compensation module that applies motion compensation to blocks within a video frame to generate prediction video blocks, and a control module that adaptively adjusts the motion compensation to apply either a first filter mode or a second filter mode to each of the blocks based on a filter mode decision.

In another aspect, the disclosure provides a method comprising performing motion compensation on blocks within a video frame to generate prediction video blocks, and applying a filter to the blocks for motion vectors that point to integer pixel locations.

In a further aspect, the disclosure provides an integrated circuit device comprising a motion compensation module that performs motion compensation on blocks within a video frame to generate prediction video blocks, wherein the motion compensation module includes a filter, and the motion compensation module applies the filter to the blocks for motion vectors that point to integer pixel locations.

In another aspect, the disclosure provides a wireless communication device handset comprising a motion compensation module that performs motion compensation on blocks within a video frame to generate prediction video blocks, wherein the motion compensation module includes a filter, and the motion compensation module applies the filter to the blocks for motion vectors that point to integer pixel locations.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor. Accordingly, this disclosure also contemplates a computer program product comprising a computer-readable medium comprising instructions to perform techniques as described in this disclosure.

The details of one or more aspects of the disclosure are set forth in the accompanying drawings and the description below. Other features, objects, and advantages will be apparent from the description and drawings, and from the claims.

BRIEF DESCRIPTION OF DRAWINGS

FIG. 9 is a diagram illustrating example characteristics of a one-dimensional, six-tap filter for luma ½-pixel interpolation.

DETAILED DESCRIPTION

In general, the disclosure is directed to video coding techniques that support adaptive filtering of motion compensated prediction blocks in a video decoder. Adaptive filtering of motion compensated prediction blocks may be applied to promote prediction accuracy and/or reduce complexity. The filtering mode may be dynamically adjusted, e.g., at a frame level, slice level, macroblock (MB) level, or block level. A filtering mode decision may be explicitly signaled by an encoder in the encoded bitstream. Alternatively, the mode decision may be determined at the decoder side based on statistics and/or characteristics of the video sequence.

In a first filtering mode, a video decoder may apply regular motion compensation to form a motion compensated prediction block. In a second filtering mode, the video decoder may apply regular motion compensation plus an additional filter to the motion compensated prediction block. The additional filter may have different characteristics. As an example, the additional filter may be a low pass filter, which also may be referred to as a smoothing filter in the following discussion. In some cases, the smoothing filter may be a 3-tap filter. In the second filtering mode, the video decoder may apply the additional filter in cascade with a regular motion compensation filter or by using a different filter that combines the regular motion compensation filter and the additional filter.

In some cases, different filters may be applied in the horizontal and vertical directions of the motion compensated prediction block. For example, a smoothing filter such as a 3-tap filter may be applied for motion vector components with integer pixel precision, while an interpolation filter such as a 2-tap filter, e.g., a bilinear filter, may be applied for motion vector components with fractional pixel precision. The different filters may be separate or form part of a combined filter.

Adaptive filtering may promote visual quality and coding efficiency. For example, adaptive filtering may be applied at the MB or block level, providing finely tuned filtering of individual blocks. A macroblock (MB) may refer to a 16-by-16 pixel area of a video frame, whereas a block or subblock may be used to refer to a smaller area. Also, additional or different filtering may be applied when needed, rather than full-time, reducing complexity.

In addition, the video coding techniques may be applied to single-layer video or multi-layer, scalable video. As mentioned above, the motion compensation filter and the additional filter may be combined, rather than applied in cascade, further reducing complexity. For scalable video coding, for example, a combined motion compensation filter module may replace a cascaded motion compensation filter and additional filter, such as a smoothing filter.

Figure 1:
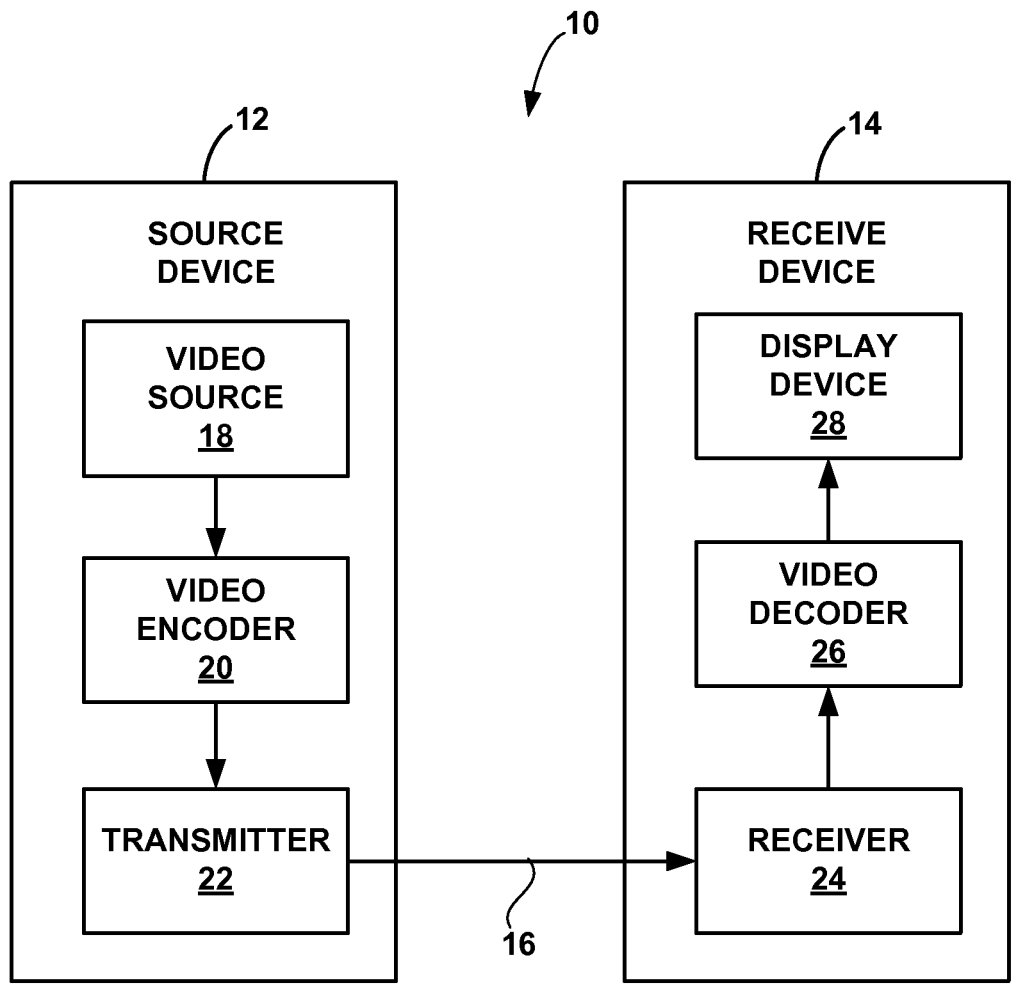
FIG. 1 is a block diagram illustrating a video encoding and decoding system.

FIG. 1 is a block diagram illustrating a video encoding and decoding system 10. As shown in FIG. 1, system 10 includes a source device 12 that transmits encoded video to a receive device 14 via a communication channel 16. Source device 12 may include a video source 18, video encoder 20 and a transmitter 22. In some aspects, transmitter 22 may be a wireless transmitter. Receive device 14 may include a receiver 24, video decoder 26 and video display device 28. In some aspects, receiver 24 may be a wireless receiver, such as a wireless receiver in a wireless communication device handset. System 10 may be configured to support adaptive filtering of motion compensated prediction blocks to improve both visual quality and processing efficiency.

Video decoder 26 may apply motion compensation to blocks within a video frame to generate prediction video blocks, and adaptively adjust the motion compensation to apply either a first filter mode or a second filter mode to each of the blocks based on a filter mode decision. Video decoder 26 may adaptively apply additional filtering to some video blocks in the second filter mode. In the first filter mode, video decoder 26 may apply regular motion compensation, which may include interpolation filtering if motion vectors reference fractional pixel locations in either the vertical dimension, horizontal dimension or both. In the second filter mode, video decoder 26 may apply motion compensation plus an additional filter to the motion compensated prediction block. As an example, the additional filter may be a smoothing filter. Alternatively, in the second filter mode, video decoder 26 may apply a different filter that combines regular motion compensation and additional filtering such as smoothing.

Video decoder 26 may adaptively adjust the motion compensation on a block-by-block, macroblock-by-macroblock, slice-by-slice, or frame-by-frame basis. The filter mode decision may be based on a signal encoded in the video frame, e.g., by video encoder 20. For example, video encoder 20 may include a flag, command or other instruction in the encoded video to indicate whether video decoder 26 should adjust motion compensation to apply the first or second filter mode. Alternatively, video decoder 26 may make the filter mode decision based on analysis of one or more characteristics of the video frame. For example, video decoder 26 may analyze the reconstructed video blocks obtained after decoding, to determine whether the second filtering mode should be applied.

In the first filter mode, video decoder 26 may apply regular motion compensation, e.g., with interpolation filtering for motion vectors with fractional pixel values. In the H.264/MPEG-4, Part 10 (Advanced Video Coding (AVC)) scheme, for example, the motion compensation filter for interpolating a pixel at a ½ pixel location may comprise a 6-tap filter. The number of taps generally indicates the number of coefficients required to represent the filter mathematically. A filter with a higher tap number generally comprises a more complex filter than those having a lower tap number. Thus, a 6-tap filter comprises a more complex filter than either a 2-tap or 3-tap filter.

In the second filter mode, video decoder 26 may apply an additional filter, such as a smoothing filter. The smoothing filter may comprise, for example, a 3-tap filter. The smoothing filter may be provided in the second filter mode as an additional filter, e.g., in addition to the motion compensation filter. Alternatively, the smoothing filter may be combined with an interpolation filter used for regular motion compensation. The combined filter used in motion compensation therefore represents a different filter, such as a 2-tap filter, for interpolating a pixel at a partial pixel location. An exemplary 2-tap filter is a bilinear filter. Hence, the second filter mode applied by video decoder 26 may include application of both the motion compensation and smoothing filters, either by the use of a motion compensation filter and an additional smoothing filter, or by the use of the different filter that combines motion compensation and smoothing. In each case, additional filtering, such as smoothing, is provided in the second filter mode.

In the second filter mode, video decoder 26 may apply the smoothing filter to both dimensions for motion vectors with both components having integer pixel precision. Alternatively, the smoothing filter, such as a 3-tap filter, may be applied in either the horizontal dimension or vertical dimension, or both, for motion vectors having integer pixel precision in those dimensions. A 2-tap motion compensation filter, such as a bilinear filter, may be applied for interpolation in at least one of the dimensions in the event motion vectors have fractional precision in such dimensions. For motion vectors having fractional pixel precision in both dimensions, a 2-tap interpolation filter may be applied for both vertical and horizontal dimensions. Similarly, for motion vectors having integer pixel precision in both dimensions, a smoothing filter may be applied in both vertical and horizontal dimensions.

For example, video decoder 26 may apply the smoothing filter in the horizontal dimension and apply a 2-tap filter, such as a bilinear filter, in the vertical dimension when a motion vector points to an integer pixel location in the horizontal dimension and to a fractional pixel location in the vertical dimension. Alternatively, video decoder 26 may apply the smoothing filter in the vertical dimension and apply a 2-tap filter such as a bilinear filter, in the horizontal dimension when a motion vector points to an integer pixel location in the vertical dimension and to a fractional pixel location in the horizontal dimension. Alternatively, video decoder 26 may apply either the smoothing filter or the interpolation filter in both dimensions, depending on integer or fractional precision of the motion vectors.

Adaptive filter adjustment, e.g., at the frame level, slice level, macroblock (MB) level, or block level, can promote both coding efficiency and processing efficiency. With adaptive filtering, additional or different filtering may be applied to frames, slices, MBs, or blocks when needed, rather than on a full-time basis, thereby reducing processing overhead. In particular, the first filtering mode may omit the additional filter, while the second filtering mode may require the additional filter to promote coding efficiency. As mentioned above, in some aspects, the additional filter may be a smoothing filter. A smoothing filter may be useful in reducing or eliminating quantization noise or other artifacts from a motion compensated prediction block.

Video decoder 26 may apply the adaptive filtering technique to single-layer video or multi-layer, scalable video. In some cases, video decoder 26 may combine a motion compensation filter and a smoothing filter, rather than applying the filters in cascade, further reducing complexity. For scalable video coding (SVC), for example, video decoder 26 may be configured to apply a combined smoothed motion compensation filter module that supports simplified processing.

In the example of FIG. 1, communication channel 16 may comprise any wireless or wired communication medium, such as a radio frequency (RF) spectrum or one or more physical transmission lines, or any combination of wireless and wired media. Channel 16 may form part of a packet-based network, such as a local area network, wide-area network, or a global network such as the Internet. Communication channel 16 generally represents any suitable communication medium, or collection of different communication media, for transmitting video data from source device 12 to receive device 14.

Source device 12 generates video for transmission to destination device 14. In some cases, however, devices 12, 14 may operate in a substantially symmetrical manner. For example, each of devices 12, 14 may include video encoding and decoding components. Hence, system 10 may support one-way or two-way video transmission between video devices 12, 14, e.g., for video streaming, video broadcasting, or video telephony.

Video source 18 may include a video capture device, such as one or more video cameras, a video archive containing previously captured video, or a live video feed from a video content provider. As a further alternative, video source 18 may generate computer graphics-based data as the source video, or a combination of live video and computer-generated video. In some cases, if video source 18 is a camera, source device 12 and receive device 14 may form so-called camera phones or video phones, including satellite or mobile wireless telephones, or other wireless communication devices. Hence, in some aspects, the techniques described in this disclosure may be implemented within a mobile wireless communication device handset, such as a mobile telephone handset. In each case, the captured, pre-captured or computer-generated video may be encoded by video encoder 20 for transmission from video source device 12 to video decoder 26 of video receive device 14 via transmitter 22, channel 16 and receiver 24. Display device 28 may include any of a variety of display devices such as a liquid crystal display (LCD), plasma display or organic light emitting (OLED) diode display.

Video encoder 20 and video decoder 26 may be configured, in some aspects of this disclosure, to support scalable video coding for spatial, temporal and/or signal-to-noise ratio (SNR) scalability. Encoder 20 and decoder 26 may support various degrees of scalability by supporting encoding, transmission and decoding of a base layer and one or more scalable enhancement layers. For scalable coding, a base layer carries video data with a minimum level of quality. One or more enhancement layers carry additional bitstream to support higher spatial, temporal or SNR levels.

Video encoder 20 and video decoder 26 may operate according to a video compression standard, such as MPEG-2, MPEG-4, ITU-T H.263, or ITU-T H.264/MPEG-4, Part 10 (AVC). Although not shown in FIG. 1, in some aspects, video encoder 20 and video decoder 22 may be integrated with an audio encoder and decoder, respectively, and include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The H.264 standard was developed by the ITU-T Video Coding Experts Group and the ISO/IEC Moving Picture Experts Group (MPEG), as the product of a partnership known as the Joint Video Team (JVT). The H.264 standard is described in ITU-T Recommendation H.264, Advanced video coding for generic audiovisual services, dated March 2005, which may be referred to herein as the H.264 standard or H.264 specification, or the H.264/AVC standard or specification. In some aspects, techniques described in this disclosure may be applied to devices that generally conform to the H.264 standard, or other devices that do not generally conform to the H.264 standard.

The Joint Video Team (JVT) continues to work on a scalable video coding (SVC) extension to H.264/MPEG-4 AVC. The specification of both H.264/MPEG-4AVC and the evolving SVC extension are in the form of a Joint Draft (JD). The Joint Scalable Video Model (JSVM) created by the JVT implements tools for use in scalable video, which may be used within system 10 for various coding tasks described in this disclosure. Detailed information concerning SVC can be found in the Joint Draft documents, and particularly in Joint Draft 7 (JD7), by Thomas Wiegand, Gary Sullivan, Julien Reichel, Heiko Schwarz, and Mathias Wien, "Joint Draft 7 of SVC Amendment (revision 2)," JVT-T201r2, July 2006, Klagenfurt, Austria.

In some aspects, for video broadcasting, this disclosure contemplates application to Enhanced H.264 video coding for delivering real-time video services in terrestrial mobile multimedia multicast (TM3) systems using the Forward Link Only (FLO) Air Interface Specification, "Forward Link Only Air Interface Specification for Terrestrial Mobile Multimedia Multicast," to be published as Technical Standard TIA-1099 (the "FLO Specification"). The FLO Specification includes examples defining bitstream syntax and semantics and decoding processes suitable for the FLO Air Interface. Alternatively, video may be broadcasted according to other standards such as DVB-H (digital video broadcast-handheld), ISDB-T (integrated services digital broadcast-terrestrial), or DMB (digital media broadcast). Hence, in some cases, source device 12 may be a mobile wireless terminal, such as a wireless communication device handset, a video streaming server, or a video broadcast server. However, the techniques described in this disclosure are not limited to any particular type of broadcast, multicast, or point-to-point system.

Video encoder 20 and video decoder 26 each may be implemented as one or more microprocessors, digital signal processors (DSPs), application specific integrated circuits (ASICs), field programmable gate arrays (FPGAs), discrete logic, software, hardware, firmware or any combinations thereof. Hence, the techniques described herein may be implemented within one or more integrated circuit devices, which may be referred to collectively as an integrated circuit device. Such an integrated circuit device may be provided within a communication device, such as a wireless communication device handset. Each of video encoder 20 and video decoder 26 may be included in one or more encoders or decoders, either of which may be integrated as part of a combined encoder/decoder (CODEC) in a respective mobile device, subscriber device, broadcast device, server, or the like. In addition, video source device 12 and video receive device 14 each may include appropriate modulation, demodulation, frequency conversion, filtering, and amplifier components for transmission and reception of encoded video, as applicable, including radio frequency (RF) wireless components and antennas sufficient to support wireless communication. For ease of illustration, however, such components are not shown in FIG. 1.

A video sequence includes a series of video frames. Video encoder 20 operates on blocks of pixels within individual video frames in order to encode the video data. The video blocks may have fixed or varying sizes, and may differ in size according to a specified coding standard. As an example, the ITU-T H.264 standard supports intra prediction in various block sizes, such as 16 by 16, 8 by 8, 4 by 4 for luma components, and 8×8 for chroma component, as well as inter prediction in various block sizes, such as 16 by 16, 16 by 8, 8 by 16, 8 by 8, 8 by 4, 4 by 8 and 4 by 4 for luma components and corresponding scaled sizes for chroma components. Smaller video blocks can provide better resolution, and may be used for locations of a video frame that include higher levels of detail. In general, macroblocks and the various smaller blocks may be considered to be video blocks. In some cases, the smaller blocks may be referred to as subblocks. After prediction, a transform may be performed on the 8×8 residual block or 4×4 residual block, and an additional transform may be applied to the DC coefficients of the 4×4 blocks for chroma components or luma component if the intra_16×16 prediction mode is used.

Figure 2:
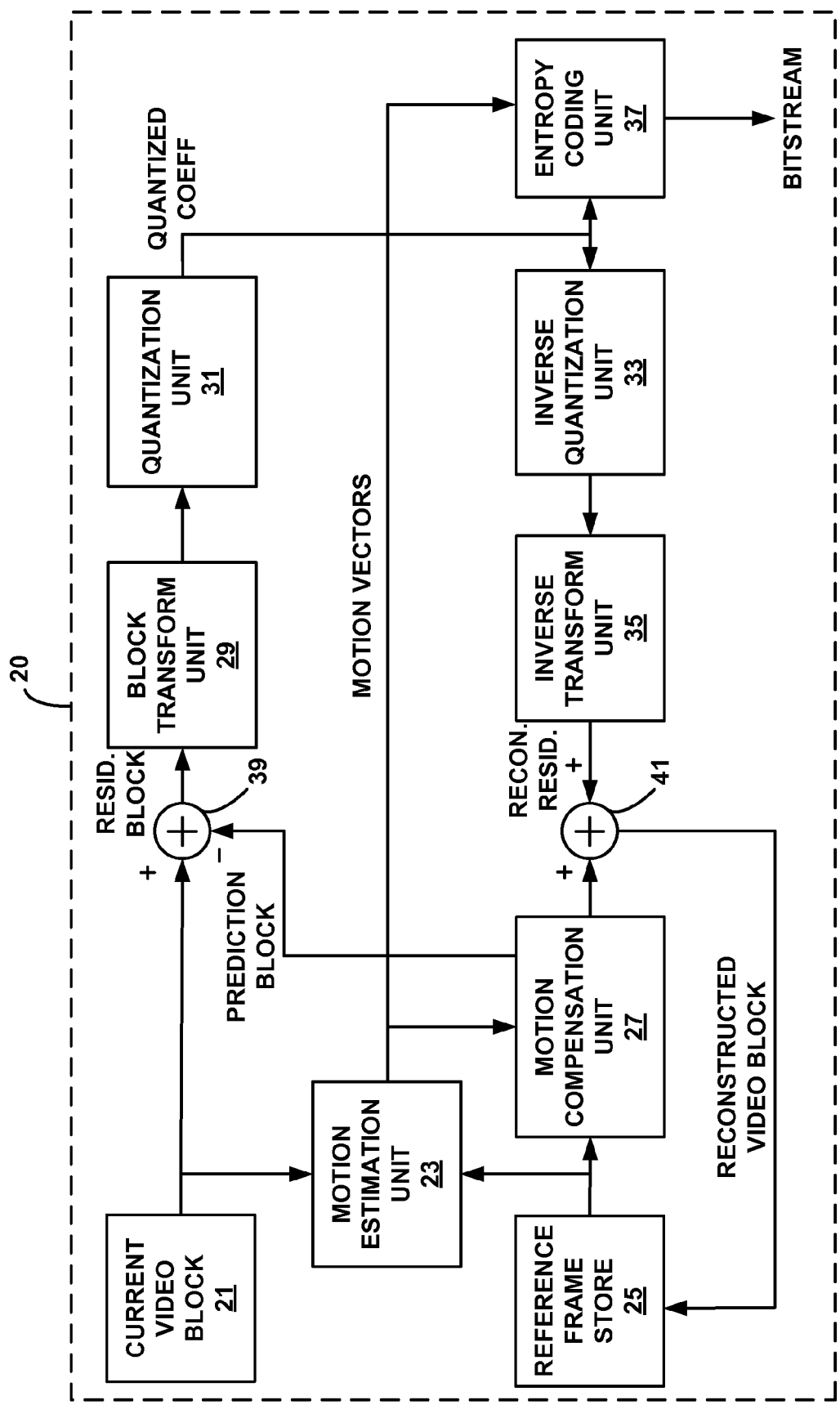
FIG. 2 is a block diagram illustrating an example of a video encoder.

FIG. 2 is a block diagram illustrating an example of a video encoder 20. Video encoder 20 may perform intra- and inter-coding of blocks within video frames. Intra-coding relies on spatial prediction to reduce or remove spatial redundancy in video within a given video frame. Inter-coding relies on temporal prediction to reduce or remove temporal redundancy in video within adjacent frames. For inter-coding, video encoder 20 performs motion estimation to track the movement of matching video blocks between two or more adjacent frames.

As shown in FIG. 2, video encoder 20 receives a current video block 21 within a video frame to be encoded. In the example of FIG. 2, video encoder 20 includes motion estimation unit 23, reference frame store 25, motion compensation unit 27, block transform unit 29, quantization unit 31, inverse quantization unit 33, inverse transform unit 35 and entropy coding unit 37. Video encoder 20 also includes summer 39 and summer 41. FIG. 2 illustrates the temporal prediction components of video encoder 20 for inter-coding of video blocks. Although not shown in FIG. 2 for ease of illustration, video encoder 20 also may include spatial prediction components for intra-coding of some video blocks.

Motion estimation unit 23 compares video block 21 to blocks in one or more adjacent video frames to generate one or more motion vectors. The adjacent frame or frames may be retrieved from reference frame store 25. Motion estimation may be performed for blocks of variable sizes, e.g., 16×16, 16×8, 8×16, 8×8 or smaller block sizes. Motion estimation unit 23 identifies a block in an adjacent frame that most closely matches the current video block 21, e.g., based on a rate distortion model, and determines a displacement between the blocks. On this basis, motion estimation unit 23 produces a motion vector that indicates the magnitude and trajectory of the displacement.

Motion vectors may have half- or quarter-pixel precision, or even finer precision, allowing video encoder 20 to track motion with higher precision than integer pixel locations and obtain a better prediction block. When motion vectors with fractional pixel values are used, interpolation operations may be carried out in motion compensation unit 27. For example, in the AVC/H.264 standard, to obtain a luma signal at half-pixel positions, the 6-tap Wiener filter with coefficients (1, −5, 20, 20, −5, 1)/32 may be used. To obtain luma signals at quarter-pixel locations, bilinear filtering on the values at integer pixel locations and the interpolated values at half pixel locations may be used. The bilinear filter also may be used in fractional pixel interpolation for the chroma components, which may have up to ⅛-pixel precision.

Motion estimation unit 23 identifies the best motion vector for a video block using a rate-distortion model. Using the resulting motion vector, motion compensation unit 27 forms a prediction video block by motion compensation. Video encoder 20 forms a residual video block by subtracting the prediction video block produced by motion compensation unit 27 from the original, current video block 21 at summer 39. Block transform unit 29 applies a transform to the residual block. Quantization unit 31 quantizes the transform coefficients to further reduce bit rate. Entropy coding unit 37 entropy codes the quantized coefficients to even further reduce bit rate. Video decoder 26 performs inverse operations to reconstruct the encoded video.

Inverse quantization unit 33 and inverse transform unit 35 apply inverse quantization and inverse transformation, respectively, to reconstruct the residual block. Summer 41 adds the reconstructed residual block to the motion compensated prediction block produced by motion compensation unit 27 to produce a reconstructed video block for storage in reference frame store 25. The reconstructed video block is used by motion estimation unit 23 and motion compensation unit 27 to encode a block in a subsequent video frame.

When performing motion compensation for a given block in the current video frame 21, motion compensation unit 27 may use a fixed set of filters to interpolate a reference block from a reference frame. One reference block is needed if the current block is uni-directionally predicted or two reference blocks are needed if the current block is bi-directionally predicted. In H.264, multiple reference frames in forward and backward directions may be used in some cases. The actual filters used in motion compensation unit 27 depend on the fractional part of the motion vector. For example, if the motion vector points to a half-pixel location in the reference frame in a given dimension, to obtain the value of the half-pixel location, a 6-tap filter such as (1, −5, 20, 20, −5, 1)/32 is used in that dimension with a half-pixel motion vector. If both motion vector components point to integer locations, the pixel values from the reference frame in reference frame store 25 may be used directly without performing any interpolation filtering operation.

Figure 3:
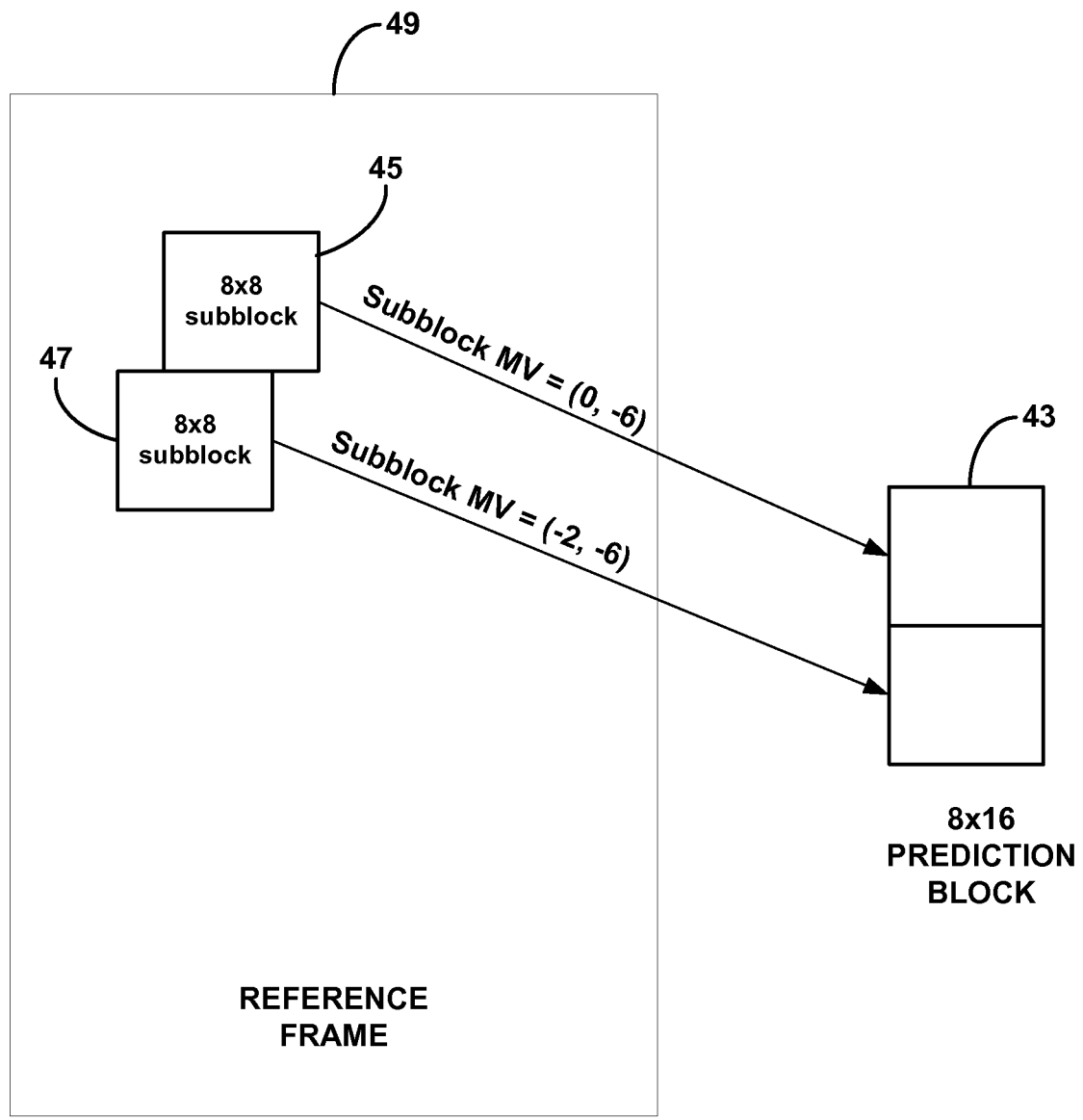
FIG. 3 is a diagram illustrating formation of a prediction block by smaller subblocks with different motion vectors.

FIG. 3 is a diagram illustrating formation of a prediction block by blocks with different motion vectors. In the example of FIG. 3, an 8×16 prediction block 43 is formed by a combination of two 8×8 subblocks 45, 47 from a reference frame 49, each with a different motion vector (MV). For example, 8×8 block 45 has a subblock motion vector of (0, −6) and 8×8 subblock 47 has a block motion vector of (−2, −6).

As discussed above, the reconstructed video block is formed by taking the sum of the motion compensated prediction video block produced by motion compensation unit 27 and the reconstructed residual block produced by inverse quantization unit 33 and inverse transform unit 35, with additional clipping operations performed if necessary. The reconstructed blocks are then stored in the reference frame store 25 for future prediction use. The reconstructed blocks may contain quantization noise and undesired artifacts when directly used to generate the prediction video block.

Applying smoothing operations on the prediction video block may alleviate such artifacts. Also, the prediction video block may be formed by subblocks that are motion compensated with different motion vectors, e.g., as shown in FIG. 3.

Thus, discontinuity may exist along the borders of these subblocks. Applying an in-loop deblocking filter, e.g., as in AVC/H.264, where the deblocking filter parameters depend on the motion information, may alleviate the discontinuity problem within the reconstructed block. However, the deblocking filter may have high computational complexity. In addition, a deblocking filter such as in H.264 is designed for improving the visual quality of the current frame instead of altering the frame such that future frames may be better predicted. Therefore, applying a smoothing operation to the prediction block obtained from motion compensation, e.g., via a low-pass filter, may provide better prediction for the current block.

Depending on the nature and magnitude of noise that may exist in individual prediction blocks, it may or may not be beneficial to apply additional smoothing filtering. This is also true if the smoothing filter is applied for the purpose of altering the reference block to make it more closely match the current block, because the objects in the reference frame and in the current frame may go through different spatial transforms. Hence, smoothing may have different impacts on the coding process as a function of the actual content of the blocks.

In accordance with various aspects of this disclosure, it is possible to adaptively decide whether a regular or filtered (smoothed) prediction block should be used. Use of a regular prediction block may involve application of motion compensation according to a first filter mode. The first filter mode may involve application of an interpolation filter if a pertinent motion vector specifies fractional pixel values. Smoothing of the prediction block may involve application of an additional filter according to a second filter mode. The filter mode decision may be encoded and sent in the encoded video bitstream. Alternatively, the filter mode decision may be inferred at the video decoder using statistics and/or characteristics of the received video.

In some instances, additional filtering, such as low pass filtering for smoothing of predictive blocks, may improve the resulting visual quality of digital video when displayed on display device 28. For example, application of a smoothing filter, such as a 3-tap [1,2,1] filter, may reduce quantization noise and the number of artifacts that occur in the predictive frame. Also, application of this smoothing filter may generate the effects of motion blur, such that the reference frame and current frame better match one another.

System 10 may be configured to support adaptive filtering of motion compensated to generate prediction blocks, which improves both visual quality and processing efficiency. For example, video decoder 26 may adaptively adjust motion compensation to apply either a first filter mode without additional filtering or a second filter mode with additional filtering. The filter mode may be adapted on a block-by-block, macroblock-by-macroblock, slice-by-slice, or frame-by-frame basis, and may be based on a signal encoded in the video frame, or analysis of one or more characteristics of the video frame. In some cases, video decoder 26 may combine a motion compensation filter and a smoothing filter, rather than applying the filters in cascade, further reducing complexity.

Figure 4:
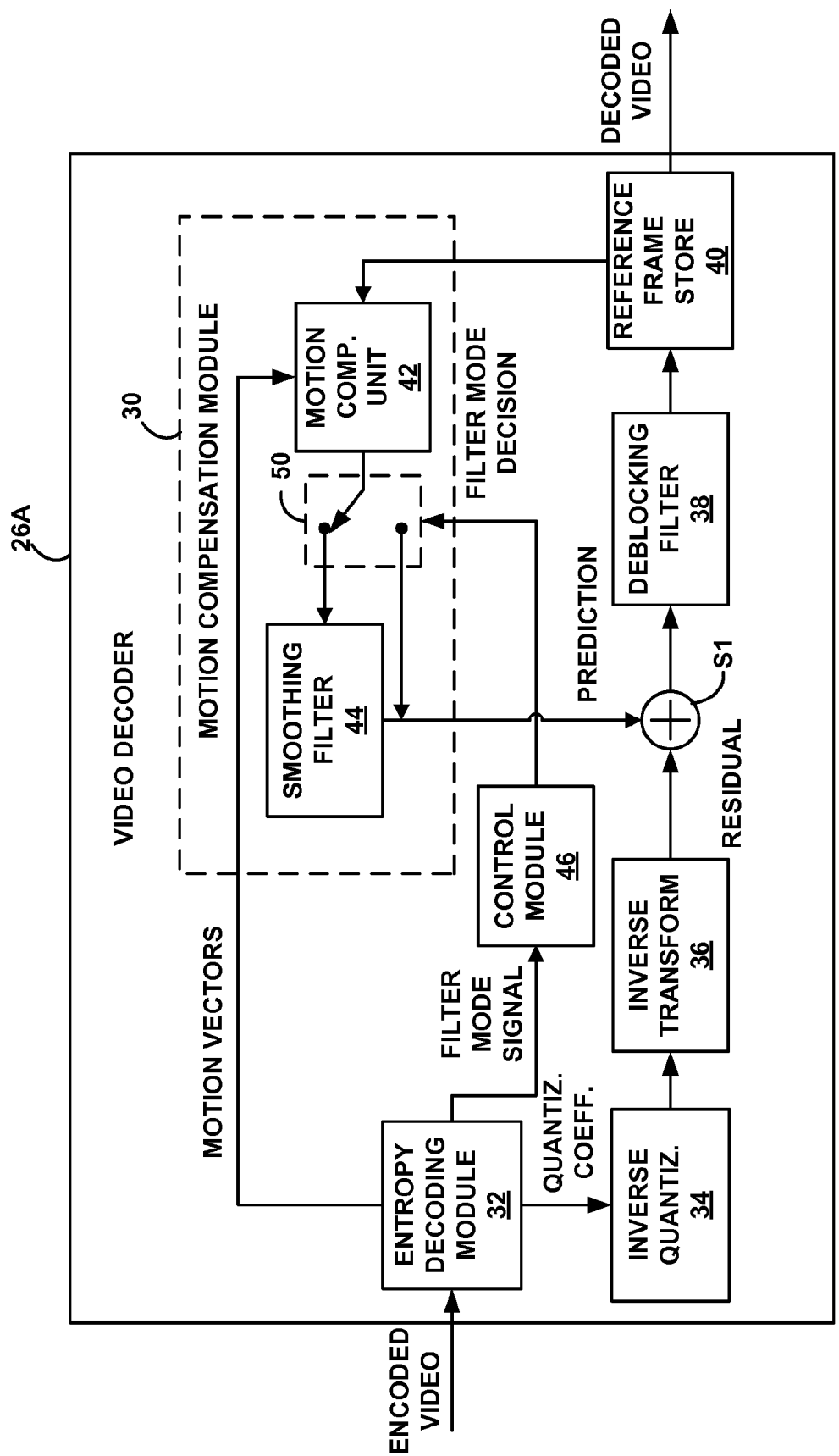
FIG. 4 is a block diagram illustrating an example of a video decoder configured to support adaptive filtering to generate prediction blocks.

FIG. 4 is a block diagram illustrating an example of a video decoder 26a configured to support adaptive filtering to generate prediction blocks. In the example of FIG. 4, video decoder 26a implements adaptive filtering based on a filter mode decision indicated by a filter mode signal encoded in the video bitstream. As shown in FIG. 4, video decoder 26A includes a motion compensation module 30, an entropy decoding module 32, an inverse quantization module 34, an inverse transform module 36, a summer S1, a deblocking filter 38, a reference frame store 40, a motion compensation unit 42, a smoothing filter 44, and a control module 46.

In a first filter mode, video decoder 26A performs regular motion compensation, which may include interpolation filtering for fractional pixel values. In a second filter mode, video decoder 26A performs motion compensation with additional filtering. Smoothing filter 44 represents an exemplary additional filter to be applied in the second filter mode. However, the disclosure should not be limited to smoothing filter 44, but may include other additional filters comprising different filtering characteristics. Although not shown in FIG. 4, video decoder 26A also supports decoding of intra-coded (I) blocks. For ease of illustration, however, FIG. 4 focuses on decoding of inter-coded (P or B) blocks.

In the example of FIG. 4, entropy decoding module 32 applies entropy decoding to encoded video to produce quantized transform coefficients, motion vectors, and a filter mode signal. Inverse quantization module 34 and inverse transform module 36 convert the transform coefficients to residual block information. Motion compensation module 30 forms a predictive block that is summed, as represented by summer S1, with the residual block information. Deblocking filter 38 filters the resulting summed block to remove "blocky" artifacts. "Blocky" artifacts often occur at lower bitrates. Exemplary inverse quantization, inverse transform and deblocking filter techniques are described in the H.264/MPEG-4 Part 10 AVC standard, although the techniques described in this disclosure may be used with other video compression standards or techniques. Video frames filtered by deblocking filter 38 are stored in reference frame store 40. Reference frame store 40 may comprise a memory capable of storing reference frames used for further predictions.

Motion compensation module 30 comprises motion compensation unit 42, which receives motion vectors from entropy decoding module 32 and reference frames from reference frame store 40 to produce predictive blocks. For example, motion compensation unit 42 applies the motion vectors to a reference frame to select matching blocks, and provides the selected blocks as predictive blocks for summing with the residual information produced by inverse transform module 36, as represented by summer S1. In some cases, motion compensation unit 42 may apply an interpolation filter to generate the predictive block from a block in the reference frame. To obtain video data at fractional pixel locations, for example, motion compensation unit 42 may include an interpolation filter. Accordingly, the first filter mode may be a mode in which regular motion compensation is performed with or without interpolation filtering, depending on whether the applicable motion vector points to integer or fractional pixel values. Motion compensation module 30 may provide the predictive block directly in a first filter mode, or apply smoothing filter 44 to the predictive block in a second filter mode 44. Hence, the second filter mode may be a mode substantially identical to the first filter mode, but with the addition of a smoothing filter 44 or other filter.

A control module 46 receives the filter mode signal from entropy decoding module 32 and controls switch 50 within motion compensation module 30 to select either a first filter mode in which the additional smoothing filter 44 is not applied, or a second filtering mode in which the additional smoothing filter 44 is applied to the predictive block produced by motion compensation unit 42. Control module 46 retrieves the filter mode signal from the decoded bitstream to determine whether the encoder has indicated the first or second filter mode, and makes an appropriate filter mode decision.

Although the selection of the first filter mode or the second filter mode is represented by a switch 50 for purposes of illustration, the selection may be a software function and need not be realized by an actual switch. In addition, although control module 46 retrieves the filter mode signal form the entropy decoded bitstream in the example of FIG. 4, the filter mode signal may be determined from the statistics and/or characteristics of the decoded video signal before or after inverse quantization or inverse transformation.

Entropy decoding module 32 transmits motion vectors to motion compensation unit 42, which performs motion compensation techniques to generate predictive blocks from reference frames stored in reference frame store 40. Smoothing filter 44, as described above, is an example of an additional filter that may be adaptively applied in accordance with the principles of this disclosure. Video decoder 26A may, in some aspects, adaptively apply smoothing filter 44 at the block level of the predicted frames based on the filter mode decision. In other words, encoder 20 may adjust the filter mode signal on a block-by-block basis. Alternatively, the filter mode signal may be adjusted on a frame-by-frame, slice-by-slice, or macroblock-by-macroblock basis. Consequently, motion compensation module 30 may adaptively apply smoothing filter 44 at the frame-, slice-, macroblock- or block-level.

Video encoder 20 may generate the filter mode decision based on analysis of one or more characteristics of the digital video being encoded. Particular statistics of the predictive block may be used to determine the filter mode to be used. For example, the amount of low- and high-pass frequency components in the predictive block may be used to derive the filter mode. If a large amount of high-pass frequency components are present in the predictive block, then the second filter mode may be applied, e.g., to provide smoothing. Alternatively, if the amount of high frequency components in the predictive block is not large, the first filter mode may be applied. Other statistics or characteristics of the predictive block and/or neighboring video blocks may be used. For example, if the predictive block is formed by small (e.g., 4×4) block partitions during motion compensation, then the second filter mode may be applied. Alternatively, if the predictive block is not formed by small block partitions, the first filter mode may be applied.

When the filter mode signal is not transmitted in the encoded bitstream, control module 46 at the decoder side may infer the filter mode signal based on analysis of the encoded video received via channel 16, using substantially the same statistics and/or characteristics of the video signal that the encoder in source device 12 might use to decide the filter mode during encoding of the video, as described above. Accordingly, like the encoder, the decoder 26A may analyze the predictive block to determine the presence of high frequency and low frequency components, and/or to determine whether the block is made up of small block partitions. On this basis, the decoder 26 selects the appropriate filter mode in substantially the same way as the encoder. In general, the encoder 20 and decoder 26 should use the same information and follow the same logic to derive the filter mode in order to prevent drifting in the decoder.

Figure 5:
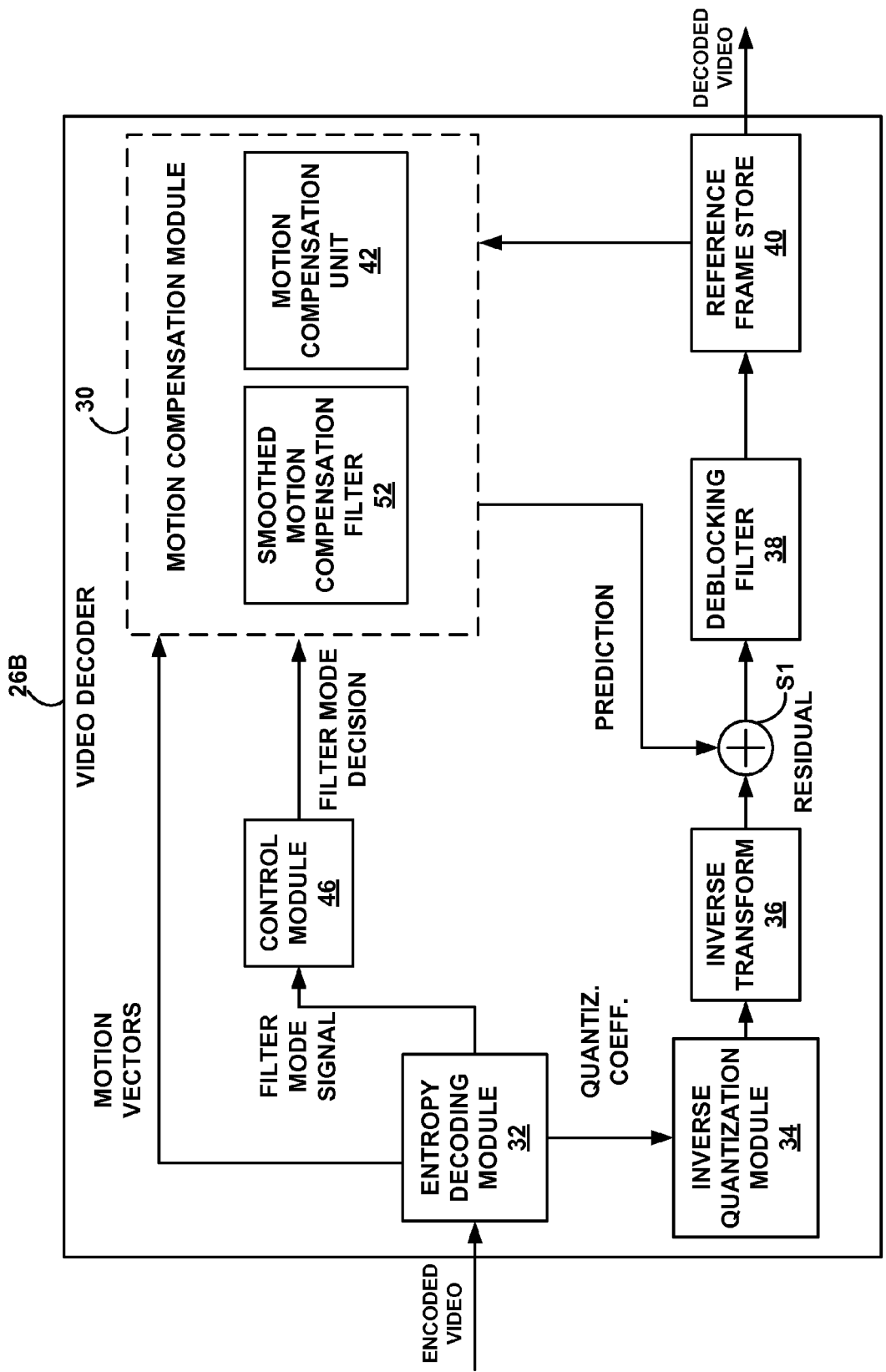
FIG. 5 is a block diagram illustrating another example of a video decoder configured to support adaptive filtering to generate prediction blocks.

FIG. 5 is a block diagram illustrating another exemplary aspect of a video decoder 26B. Video decoder 26B may be substantially similar to the video decoder 26A of FIG. 4. However, video decoder 26B further includes a smoothed motion compensation module 52 that combines interpolation filtering associated with regular motion compensation and additional smoothing. When control module 46 generates a filter mode decision indicating the first filter mode, motion compensation module 30 selects motion compensation unit 42 to generate the predictive block without additional filtering. In this case, motion compensation unit 42 performs regular motion compensation, which may include interpolation filtering for motion vectors with fractional pixel precision. When control module 46 generates a filter mode decision indicating the second filter mode, however, motion compensation module 30 selects smoothed motion compensation filter 52. Hence, control module 46 selects whether a regular or smoothed prediction block should be used.

In effect, smoothed motion compensation filter 52 may combine the features of motion compensation unit 42 and a smoothing filter. In this manner, in the second filter mode, smoothing may be applied in combination with interpolation filtering, rather than in a cascade. With a single filter module, instead of two or more filter modules, processing complexity may be reduced. To obtain video at fractional pixel locations, motion compensation unit 42 may include the functionality of an interpolation filter. When an additional filter, such as a smoothing filter, is applied, it may be combined with the interpolation filter in motion compensation unit 42 to form smoothed motion compensation filter 48, and thereby reduce system complexity. Smoothed motion compensation module 52 combines the functionality of motion compensation unit 42 and a smoothing filter based on multiple assumptions and approximations, which will be described below.

An alternative way to view this combination of interpolation filter and smoothing filter is that motion compensation module 30 invokes a different, modified filter, i.e., smoothed motion compensation filter 52, in the second filter mode when a smoothed prediction block is to be produced. In other words, the cascade of a smoothing filter S with motion compensation MC to produce S(MC(reference block(s), motion vector(s)) is replaced with a combined filter MC'(reference block(s), motion vector(s)) that is the mathematical approximation of S(MC( )).

This mathematical approximation may be embodied in smoothed motion compensation filter 52 for application in the second filter mode when smoothing is desired. An example of how to form the filters used in MC' of smoothed motion compensation filter 52 may be derived from the framework of the scalable video coding (SVC) extension to H.264/AVC. The approach of performing additional filtering on the motion compensated prediction may be referred to as adaptive motion compensation in this disclosure. In some cases, the filter mode signal may be the smoothedPred flag specified in the H.264/AVC standard. In particular, control module 46 may interpret the status of the smoothedPred flag as an indication of the filter mode decision.

Figure 6:
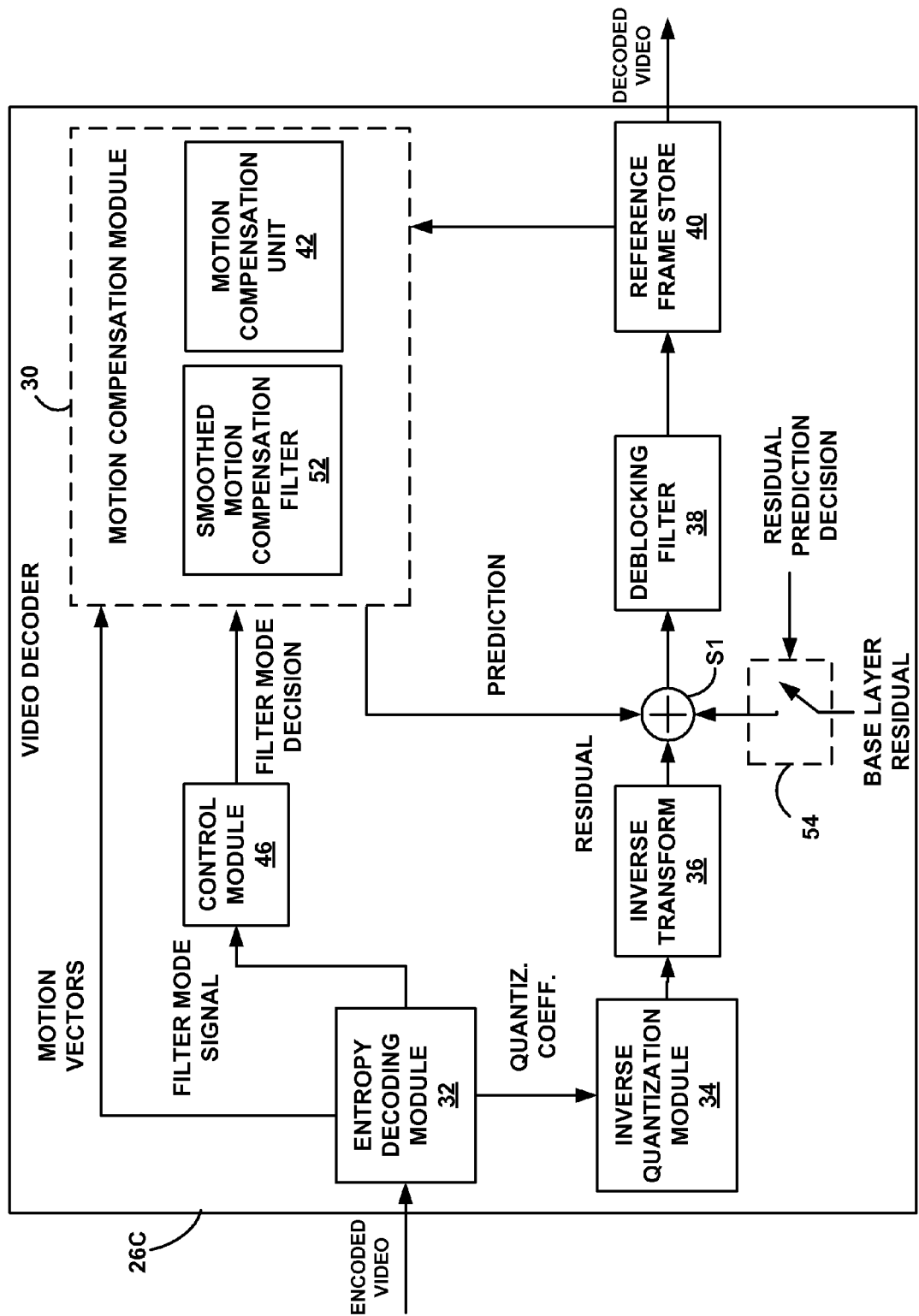
FIG. 6 is a block diagram illustrating an example of a video decoder configured to support scalable video coding (SVC) using adaptive filtering to generate prediction blocks.
Figure 7:
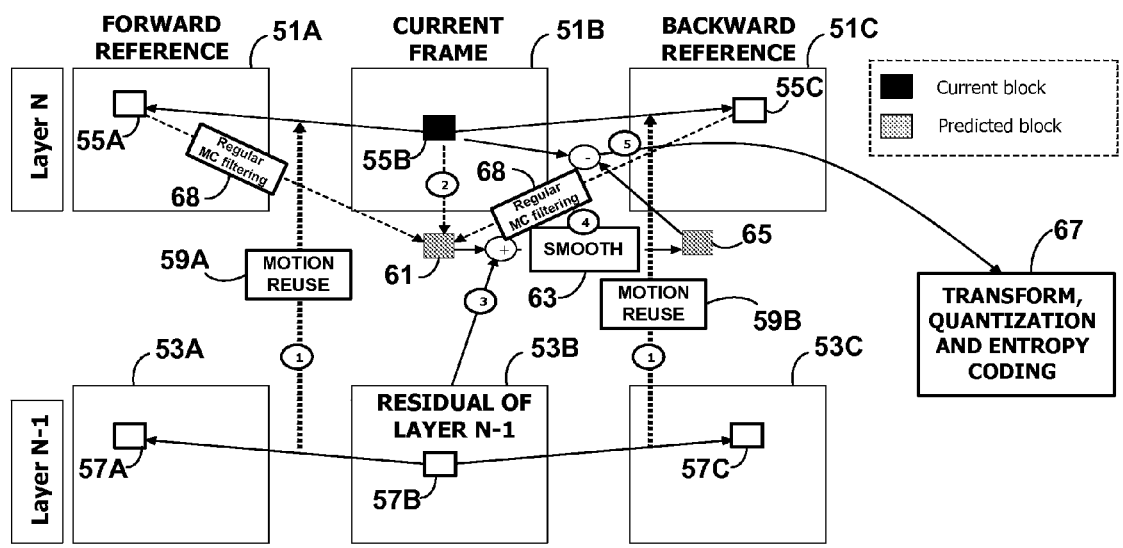
FIG. 7 is a diagram illustrating application of a smoothed reference process in SVC enhancement layer coding.
Figure 8:
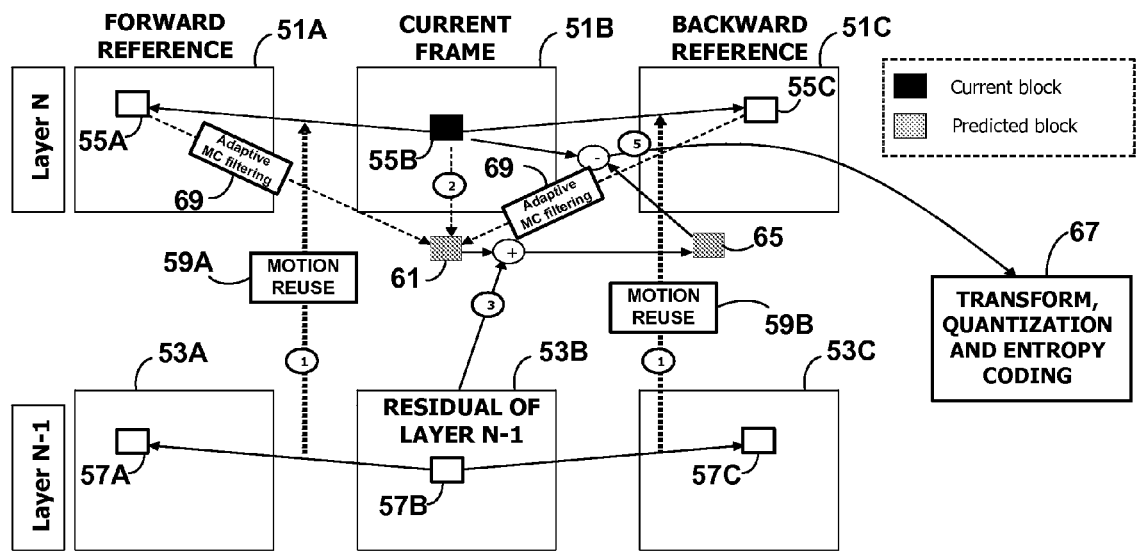
FIG. 8 is a diagram illustrating application of a smoothed reference process using adaptive motion compensation in SVC enhancement layer coding.

FIGS. 6-8 illustrate a context for derivation of an example smoothed motion compensation filter 52. However, the techniques should not be limited to this exemplary derivation and may be applied to the general framework discussed above. Smoothed motion filter 52 may be substantially similar to smoothed motion filter 52 discussed below in reference to FIG. 6.

FIG. 6 is a block diagram illustrating another exemplary video decoder 26C. In FIG. 6, video decoder 26C may be configured to support scalable video coding (SVC). As an example, video decoder 26C may be compliant with the SVC extension of the H.264/MPEG-4 Part 10 AVC standard. Video decoder 26C may be substantially similar to the video decoder 26B of FIG. 5, but be further configured to support SVC. As in the example of FIG. 5, the filter mode signal in the example of FIG. 6 may be the smoothedPred flag specified in the H.264/MPEG-4 Part 10 AVC standard. In this example, control module 46 may interpret the status of the smoothedPred flag as an indication of the filter mode decision. In the example of FIG. 6, video decoder 26C further includes the functionality of a switch 54 that may receive as an input a ResPred flag according to the SVC extension to AVC/H.264, as described in more detail below.

The Joint Video Team (JVT), which consists of video coding experts from ISO/IEC MPEG and ITU-T VCEG, is currently working on the SVC extension to H.264/AVC. The common software, called JSVM (Joint Scalable Video Model), is being used by the participants. JSVM supports combined scalability. A bitstream may have SNR scalability, Fine Granularity Scalability (FGS), spatial scalability, and temporal scalability. Spatial scalability allows video decoder 26C to reconstruct and display a video signal of higher spatial resolution, e.g., common intermediate format (CIF) instead of quarter common intermediate format (QCIF), by decoding enhancement layer bitstreams from an SVC bitstream.

SVC supports a number of inter-layer prediction techniques to improve coding performance. For example, when coding an enhancement layer macroblock, the corresponding macroblock mode, motion information, and residual signals from the base or previous layer may be used. In particular, a BLskip flag may be added as the macroblock (MB) level syntax element. If the current MB is an inter MB and the BLskip flag is set to 1, then the enhancement layer MB will inherit MB mode, motion vectors, and reference picture indices from the corresponding base or previous layer MB.

When spatial scalability is used, the enhancement layer represents a video signal of higher spatial resolution than that of the base or previous layer bitstream. In this case, the base or previous layer MB information is upsampled before it is used in inter-layer prediction. As an example, when the spatial scalability factor is 2:1 (dyadic spatial scalability), the base or previous layer MB information is upsampled by a factor of 2 in each dimension. If the base or previous layer MB has MODE_8×8 (inter predicted macroblock with four 8×8 blocks), then the upsampled video signal will have four macroblocks with MODE_16×16 at corresponding locations.

Another inter-layer prediction method, residual prediction, is also supported in SVC. Some residual blocks in the base or previous layer may be correlated to the corresponding enhancement layer residual blocks. For these blocks, applying residual prediction may reduce the enhancement layer residual energy and improve coding performance. In SVC, whether residual prediction is used or not is indicated using a one-bit flag ResPred. Like BLskip, ResPred is also coded as a macroblock level syntax element. If ResPred=1, then the enhancement layer residual is coded after subtracting from it the base or previous layer residual block.

Therefore, to properly decode the enhancement layers, video decoder 26C may add the base or previous layer residual blocks to the enhancement layer. With reference to FIG. 6, for example, if ResPred=1, switch 54 provides the base or previous layer residual ("base layer residual" in FIG. 6) to the summer S1 that sums the enhancement layer residual ("residual" in FIG. 6) and prediction block ("prediction" in FIG. 6). In contrast to the SVC context, FIG. 5 shows similar techniques but does not include the representation of switch 58 to provide the base layer residual to this summer. Similar to switch 50 of FIG. 4, however, switch 54 is for purposes of illustration only and the selection of whether to provide the base layer residual may be a software function and need not be realized by an actual switch.

If spatial scalability is used, then the base or previous layer residual signal is upsampled before being used in inter-layer prediction. In the case of dyadic spatial scalability, SVC uses the bilinear filter to upsample the residual signal. More details on inter layer prediction used in SVC may be found, e.g., in Thomas Wiegand, Gary Sullivan, Julien Reichel, Heiko Schwarz, and Mathias Wien, "Joint Draft 7 of SVC Amendment (revision 2)," JVT-T201r2, July 2006, Klagenfurt, Austria (JD7).

Based on residual prediction, a technique called Smoothed Reference (SR) may be applied in a video decoder to further improve coding performance for spatial scalability. An example of the SR technique is described in Woo-Jin Han "Modified IntraBL design using smoothed reference," JVT-R091r1, January 2006, Bangkok, Thailand. Video coding techniques that support adaptive filtering of motion compensated prediction blocks, as described in this disclosure, may achieve coding gain similar to the SR technique but with significantly lower complexity. For context, an example SR technique is described below in conjunction with FIG. 7, which is a diagram illustrating application of a smoothed reference (SR) process in SVC enhancement layer coding.

Derivation of an example implementation of smoothed motion compensation filter 52, in accordance with certain aspects of this disclosure, will now be described with reference to the H.264/MPEG-4 Part 10 AVC standard. First, the following equation (1) describes, in part, the Smoothed Reference operation of the SVC extension to the H.264/MPEG-4 Part 10 AVC standard as:

$$O - S(P + U_R(R_b)) \qquad (1)$$

where O represents the original block in the current coding layer, S represents the application of the smoothing filter, P represents the predictive block, $U_R$ represents the upsampling operation between the current layer and the base or previous layer, and $R_b$ represents the reconstructed residual block. In accordance with this disclosure, equation (1) may be simplified as follows by typical mathematical operations, yielding the following equation (2):

$$O - S(P) - S(U_R(R_b)) \qquad (2)$$

Equation (2) may be further simplified to equation (3) below by noting that the effects of smoothing the upsampled reconstructed residual block, or the $S(U_R(R_b))$ part of equation (2), often yields minor if any improvements in visual quality. It has been observed experimentally that the performance gain from the SR process may be retained by smoothing only the prediction signal P. Thus, based on the assumption that $S(U_R(R_b))$ can be adequately represented as $U_R(R_b)$, the following equation (3) results:

$$O - S(P) - U_R(R_b) \qquad (3)$$

According to equation (3) above, smoothed reference in SVC may be considered a special case of the more general framework shown in the exemplary aspect of video decoder 26A of FIG. 4. Contrary to the SR technique of applying cascaded motion compensation MC( ) and smoothing S( ), smooth motion compensation filter 52 may be configured to support a modified motion compensation MC'( ), herein referred to as smoothed motion compensation.

FIG. 7 is a diagram illustrating exemplary application of a smoothed reference (SR) process in SVC enhancement layer coding. More particularly, FIG. 7 shows a motion compensation process in a video decoder involving a forward reference frame 51A, current frame 51B and backward reference frame 51C in an enhancement layer (Layer N) and a forward reference frame 53A, current frame 53B and backward reference frame 53C in a base or previous layer (Layer N−1). FIG. 7 illustrates bi-directional prediction. However, prediction in one direction may be used.

First, when both the ResPred and BLskip flags are set for a given MB 55B in the enhancement layer, an additional flag SmoothedRef is sent by encoder 20. When SmoothedRef=1, the possibly upsampled motion vectors $U_{mv}(MVb)$ from the corresponding macroblock 57B in the base or previous layer (Layer N−1) are used to code the current video block 55B in the enhancement layer (Layer N), where $U_{mv}( )$ is the upsampling operation on motion vectors. This step is indicated as "motion reuse" 59A, 59B in the diagram of FIG. 7. If the resolution of the enhancement layer is the same as that of the base layer, then $U_{mv}(MVb)=MVb$. Alternatively, the upsampling operation $U_{mv}( )$ is needed to upsample from the spatial resolution of the base layer (or previous layer) to the resolution of the applicable enhancement layer.

Second, a prediction block (P) 61 is generated through motion compensation with regular motion compensation filtering 68 using the motion vectors derived in the motion reuse operation 59A, 59B. Third, the corresponding reconstructed residual block 57B (Rb) from the base or previous layer (Layer N−1) is upsampled to obtain $U_R(R_b)$, where $U_R( )$ is the upsampling operation on the residual. Reconstructed residual block 57B is obtained from motion vectors pointing to corresponding blocks 57A, 57C in the reference frames 53A, 53C in the base or previous layer N−1. If spatial scalability is not used, then the $U_R(r)=r$. Upsampled block $U_R(R_b)$ is added to the prediction block 61 (P). This addition occurs because the ResPred flag is set, thereby causing a switch, such as switch 54 of FIG. 6, to provide the base layer residual, which in this instance is upsampled block $U_R(R_b)$, to a summer S1.

Fourth, a smoothing filter 63 (S) is applied to the block $P+U_R(R_b)$ to obtain a smoothed block 65 $(S(P+U_R(R_b)))$. As an example, a 3-tap low-pass filter with coefficients [1,2,1] may be used as the smoothing filter 63. A macroblock (MB) is filtered in the horizontal direction first and then in the vertical direction. Fifth, the prediction residual difference $O-S(P+U_R(R_b))$, where O is the original block in the current layer (Layer N), is the prediction residual and is coded in typical steps such as transform, quantization and entropy coding 67. An SR process, as in SVC, may entail high complexity. SR adds one additional filtering operation, e.g., smoothing filter 63, on top of any fractional pixel interpolation filters used in motion compensation, presenting very high computational complexity.

For different prediction blocks, given different amounts and types of noise, application of additional smoothing filtering is not always necessary. In accordance with various aspects of this disclosure, it is possible to adaptively decide whether a regular or filtered (smoothed) prediction block should be used. Use of a regular prediction block may involve application of motion compensation according to a first filter mode. The first filter mode may involve application of an interpolation filter if a pertinent motion vector specifies fractional pixel values. Smoothing of the prediction block may involve application of an additional filter according to a second filter mode. As described in this disclosure, selection of the first or second filter mode may be based on a filter mode decision. By selectively applying either the first or second filter mode, computational complexity may be reduced for some blocks.

FIG. 8 is a diagram illustrating exemplary application of a smoothed reference (SR) process using adaptive motion compensation in SVC enhancement layer coding. More particularly, FIG. 8 shows another motion compensation process in a video decoder involving a forward reference frame 51A, current frame 51B and backward reference frame 51C in an enhancement layer (Layer N) and a forward reference frame 53A, current frame 53B and backward reference frame 53C in a base or previous layer (Layer N−1). FIG. 8 illustrates bi-directional prediction. However, prediction in one direction may be used. The motion compensation process shown in FIG. 8 may be substantially similar to the motion compensation process shown in FIG. 7. In FIG. 8, however, the motion compensation process comprises adaptive motion compensation (MC) filtering 69, which replaces regular motion compensation filtering 68 and smoothing filter 63 of FIG. 7.

As described above, adaptive motion compensation filtering 69 may apply a different filter that represents a combination of two filters, e.g., an interpolation filter and a smoothing filter. The different filter provided by adaptive motion compensation filtering 69 may be used, for example, as smoothed motion compensation filter 52 in the example of FIG. 5 or FIG. 6. Mathematically, in the example of FIG. 8, the cascade of a smoothing filter 63 with regular motion compensation filtering 68 to produce S(MC(reference block(s), motion vector(s)) is replaced with a combined filter MC' (reference block(s), motion vector(s)) or advanced motion compensation filtering 69 that is the mathematical approximation of S(MC( )), or cascaded regular motion compensation filtering 68 and smoothing filter 63. By combining application of these two filters, the complexity of a video decoder may be reduced, while still possibly generating a prediction video block 61 of equal or higher visual quality than the same prediction visual block 61 generated above in reference to FIG. 7.

Adaptive motion compensation filtering 69, which applies smoothed motion compensation filter 52, may further be described through consideration of an example case, dyadic spatial scalability. In dyadic spatial scalability, ¼-pixel motion vectors in the base or any previous layers are upsampled to become ½-pixel motion vectors in the enhancement layer. For ½-pixel precision motion vectors, a 6-tap filter is used in H.264/MPEG-4 Part 10 AVC and SVC motion compensation process MC( ).

Figure 9:
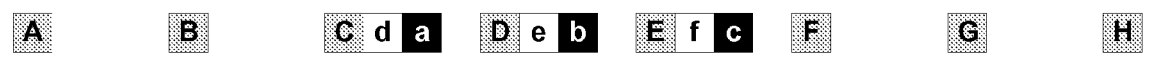

FIG. 9 is a diagram of an example of a one-dimensional, six-tap filter for luma ½-pixel interpolation. In FIG. 9, the gray boxes represent integer pixel locations, the black boxes represent ½ pixel locations, and the white boxes represent ¼ pixel locations. To interpolate the ½-pixel locations denoted by a, b, and c, the following equations (4) may be used:

$$a = (A - 5*B + 20*C + 20*D - 5*E + F + 16) >> 5$$

$$b = (B - 5*C + 20*D + 20*E - 5*F + G + 16) >> 5$$

$$c = (C - 5*D + 20*E + 20*F - 5*G + H + 16) >> 5 \quad (4)$$

where A, B, C, D, E, F, G, and H represent integer pixel locations.

By assuming that a slightly different smoothing filter with coefficients [1, 4, 1] is used in place of the conventional [1, 2, 1] filter defined in the SVC extension, the equation for center ½-pixel location, or b, reduces to the following equation (5):

$$b' = (a + 4*b + c + 3)/6 = \quad (5)$$
$$(A - B + C + 95*D + 95*E + F - G + H + 16 + 96)/192 \cong$$
$$(D + E + 1) >> 1$$

In the above equation (5) and below equations (6) and (7), rounding offsets are omitted to simplify the discussion without loss of generality. In actual implementation, a rounding offset can be used before the division is performed in each of equations (5)-(7). Equation (5) results in a low-complexity 2-tap filter: (D+E)/2. This 2-tap filter may be used in the combined smoothed motion compensation filter MC'( ) for ½-pixel interpolation. For integer pixel motion vectors, smoothed motion compensation filter MC'( ) may apply a 3-tap [1, 2, 1] smoothing filter to obtain the smoothing effect. In this way, the complexity of the filters used in MC'( ), i.e., smoothed motion compensation filter 52, may be significantly less than the combined complexity of the normal motion compensation filter MC( ), i.e., in motion compensation unit 42, cascaded with the additional smoothing operation, i.e., smoothing filter 44. In summary, smoothed motion compensation filter MC'( ) in smoothed motion compensation module 52 may be configured to provide the following filter functions:

(1) if both components (vertical and horizontal) of the base motion vector (after upsampling) have integer precision, then a smoothing filter is applied in vertical and horizontal directions;

(2) if one component of the base motion vector has integer precision and the other has fractional (e.g., ½) pixel precision, then the interpolation with a 2-tap filter, such as a bilinear filter, is carried out on the ½ pixel component first, in conjunction with the application of the smoothing filter to the other component in the other dimension; and (3) if both components of the base motion vector have fractional pixel precision, then the interpolation with the 2-tap filter is performed in both dimensions, i.e., vertical and horizontal.

SVC may also support extended spatial scalability (ESS), where the scaling factor between base and enhancement layer video dimensions may be arbitrary. For ESS, the base or previous layer motion vectors are upsampled by the scaling factor and rounded to the nearest ¼-pixel locations. For motion vectors with ¼-pixel precisions, the bilinear filter may be used in interpolation. Similar to equation (5) above, the combination of the bilinear filter in MC( ) and the smoothing filter in S( ) may be roughly approximated by a weighted average filter in MC'( ), according to equation (6) below. As the smoothing filter may be combined with the bilinear filter in ½-pixel interpolation, so can the smoothing filter be combined with the bilinear filter in ¼-pixel interpolation, yielding a weighted average filter in MC'( ) defined in the following equation (6):

$$e' = (d + 4*e + f + 3)/6 = \quad (6)$$
$$(223*D + 127*E + 33*C + F - B - G + A + H + 192)/384 \cong$$
$$(7*D + 4*E + C + 6)/12 \cong (2*D + E + 3)/6$$

where e' represents the ¼-pixel location to be approximated and d, e, and f represent ¼ pixel locations. Again, the cascaded filtering operations can be approximated by interpolation with a 2-tap filter. Although this weighted average filter may improve visual quality, this improvement may not warrant the added complexity introduced by a weighted average filter. Accordingly, in some cases, smoothed motion compensation module 52 may not implement this weighted average filter. Instead, smoothed motion compensation module 52 may implement a 2-tap filter with lower implementation complexity, such as a bilinear filter defined by the following equation (7):

$$e' \cong (3*D + E)/4 \quad (7)$$

In this case, the 2-tap filter used for interpolating at a partial pixel location becomes a bilinear filter for both ½-pixel locations and ¼-pixel locations in the case of ESS. Note that the above example of spatial scalability in SVC serves only as an example to illustrate the filters that may be used in the combined MC'( ) of smoothed compensation module 52, as shown in FIGS. 5 and 6, and is not intended to limit the scope of this disclosure. The concept of a locally adaptive motion compensation filter and the filter with the special characteristics discussed above may be applied to general single-layer or multiple-layer video coding systems.

Figure 10:
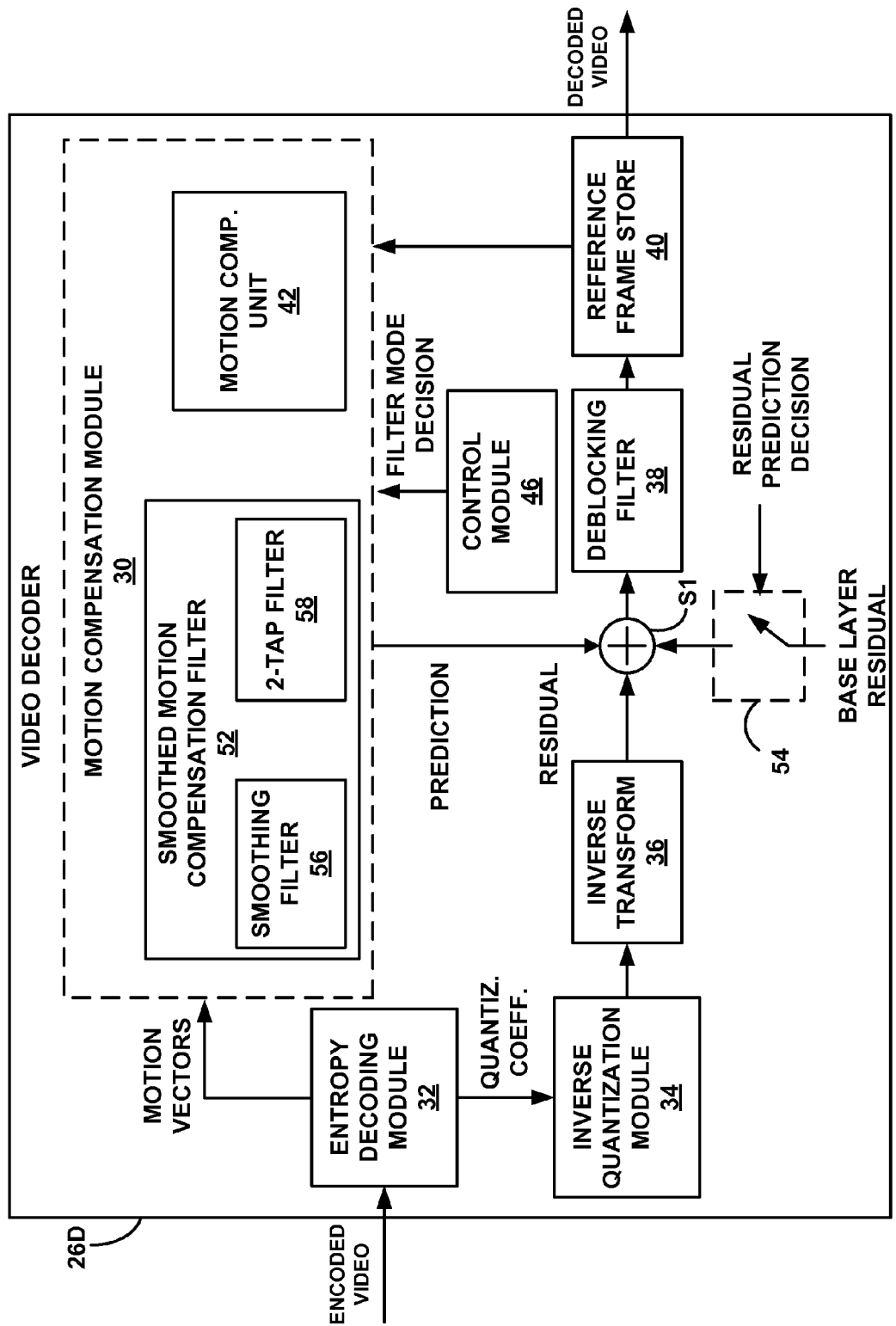
FIG. 10 is a block diagram illustrating an example of a video decoder configured to support application of different adaptive filters in the vertical and horizontal dimensions of a prediction block to accommodate motion vector components with integer or fractional pixel precision.

FIG. 10 is a block diagram illustrating another exemplary aspect of video decoder 26D configured to support application of different filters in the vertical and horizontal dimensions of a prediction block to accommodate motion vectors components with integer or fractional pixel precision. In FIG. 10, video decoder 26D substantially conforms to video decoder 26C in the example of FIG. 6, but further illustrates the application of different filter functions for integer and fractional pixel precision motion vectors, e.g., in the vertical and horizontal dimensions. In the example of FIG. 10, video decoder 26D implements adaptive motion compensation by adaptively applying different filter functions in the horizontal and vertical dimension of the predictive blocks when motion vectors in one dimension point to integer pixel positions and motion vectors in the other dimension point to fractional pixel positions. For example, the combined filter implemented by smoothed motion compensation filter 52 may, in effect, apply a smoothing filter for motion vector components having integer pixel precision, and an interpolation filter, such as a 2-tap filter, which may be a bilinear filter, for motion vector components having fractional pixel precision. Hence, FIG. 10 further illustrates the operation of smoothed motion compensation filter 52, e.g., as described with respect to smoothed motion compensation filter MC'( ) above.

Similar to video decoder 26C shown in FIG. 6, video decoder 26D of FIG. 10 comprises motion compensation module 30, entropy decoding module 32, an inverse quantization module 34, an inverse transform module 36, a deblocking filter 38, a reference frame store 40, motion compensation unit 42, and switch 54. As described above, if decoder 26D is used in decoding an SVC video stream and both the residual prediction mode is used and the additional filtering is indicated, the base layer (or previous layer) residual, with proper upsampling if the base layer has a different resolution from that of the enhancement layer, may be added to the reconstructed residual at the current layer and the prediction to obtain the reconstructed video. In these embodiments, video decoder 26D may include the functionality of a switch 54 to provide the base layer residual for summation with the enhancement layer residual and prediction blocks in accordance with the SVC extension of H.264/MPEG 4 Part 10.

In addition, in the example of FIG. 10, motion compensation module 30 includes a smoothed motion compensation filter 52. In the example of FIG. 10, smoothed motion compensation filter 52 further includes a smoothing filter 56 and a 2-tap filter 58, where 2-tap filter 58 may comprise a bilinear filter. Smoothing filter 56 may be formed by a 3-tap filter.

Control unit 46 generates a filter mode decision based on the filter mode signal obtained from the encoded video bitstream. The filter mode decision may change on a block-by-block basis to apply regular motion compensation via motion compensation unit 42 or motion compensation plus additional filtering represented by smoothing filter 56 or 2-tap filter 58 via smoothed motion compensation filter 52. In particular, for the second filtering mode, control module 46 adaptively applies one or both of additional filters 56, 58 via smoothed motion compensation filter 52 when the filter mode signal in the encoded video bitstream indicates that additional filtering should be applied or, in some alternative implementations, when control module 46 infers from analysis of the received video that additional filtering should be applied.

Smoothed motion compensation filter 52 applies smoothing filter 56 and 2-tap filter 58, such as a bilinear filter, in appropriate dimensions of predicted blocks when the second filter mode is selected.

Application of smoothing filter 56 and 2-tap filter 58 in the second filtering mode depends on the motion vector associated with a predicted block. For example, if a motion vector points to fractional pixel locations in the horizontal dimension of a reference frame stored in reference frame store 40, and the second filter mode is selected, smoothed motion compensation filter 52 applies a 2-tap filter 58, e.g., a bilinear filter, as a horizontal filter in the horizontal dimension of the predictive block. If the motion vector points to integer pixel locations in the horizontal dimension of the reference frame, however, and the second filter mode is selected, smoothed motion compensation filter 52 applies a smoothing filter 56, e.g., a 3-tap filter, as a horizontal filter in the horizontal dimension of the predictive block.

If the motion vector also points to fractional pixel locations in the vertical dimension of the reference frame, and the second filter mode is selected, smoothed motion compensation filter 52 applies a 2-tap filter 58, e.g., the bilinear filter, as a vertical filter in the vertical dimension of the predictive block. Further, if the motion vector points to integer pixel locations in the vertical dimension of the reference frame, and the second filter mode is selected, smoothed motion compensation filter 52 applies smoothing filter 56 as a vertical filter in the vertical dimension to the predictive block. Hence, smoothed motion compensation filter 52 may apply a 2-tap filter 58, such as a bilinear filter, in the horizontal dimension and a smoothing filter, such as a low pass filter, in the vertical dimension, a smoothing filter 56, such as a low pass filter, in the horizontal dimension and a 2-tap filter, such as a bilinear filter, in the vertical dimension, 2-tap filters such as bilinear filters in both the horizontal and vertical dimensions, or smoothing filters, such as 3-tap low pass filters, in both the horizontal and vertical dimensions.

In this way, in the second filter mode, video decoder 26D may adaptively apply different filters in the horizontal and vertical dimensions of a predictive block based on whether the motion vectors point to fractional or integer pixel locations. In the first filter mode, motion compensation unit 42 applies regular motion compensation without additional filtering. Regular motion compensation in the first filter mode may include interpolation filtering in some cases, e.g., for fractional precision motion vector components. In the second filtering mode, because additional filtering may be achieved by adaptively using smoothed motion compensation filter 52 in different dimensions at the block-level and tailored to specific instances, video decoder 26D of FIG. 10 may provide improved coding efficiency and processing efficiency over conventional video decoders.

In summary, for the second filtering mode, if both components (vertical and horizontal) of the motion vector have integer precision, then smoothed motion compensation filter 52 applies smoothing filter 56 in both the vertical and horizontal dimensions. If one component of a base motion vector has integer precision and the other has fractional pixel precision, then smoothed motion compensation filter 52 applies 2-tap filter 58 for the fractional pixel component in one dimension, and smoothing filter 56 is applied for the other integer pixel component in the other dimension. If both components of the motion vector have fractional pixel precision, then smoothed motion compensation filter 52 applies 2-tap filter 58 in both dimensions, i.e., vertical and horizontal. Hence, horizontal filtering may comprise one of a 2-tap filter 58 or a smoothing filter 56, and vertical filtering may comprise one of a 2-tap filter or a smoothing filter, according to whether a pertinent motion vector component in the horizontal or vertical dimension has fractional or integer pixel precision. Horizontal filtering may be applied before application of vertical filtering, or vice versa.

Figure 11:
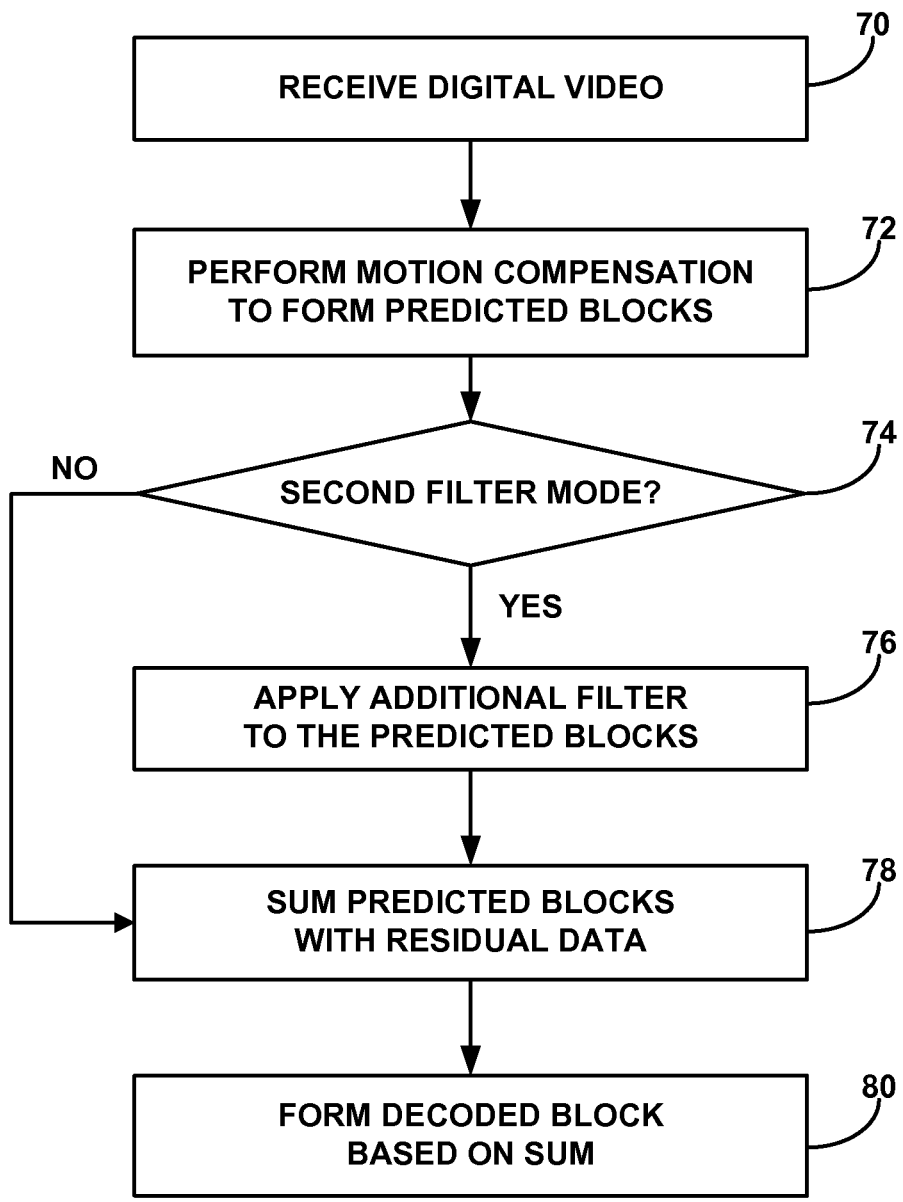
FIG. 11 is a flow diagram illustrating exemplary operation of a video decoder in performing adaptive motion compensation at the block level of inter coded frames.

FIG. 11 is a flow diagram illustrating exemplary operation of the video decoder 26A of FIG. 4 in performing adaptive motion compensation at the block level of inter-coded frames. As shown in FIG. 11, video decoder 26A receives encoded digital video (70), e.g., via channel 16, and performs motion compensation to form predicted blocks (72). Motion compensation in a first filter mode may involve selection of corresponding blocks in one or more reference frames using motion vectors received with the digital video, and interpolation filtering if the motion vectors point to fractional pixel locations. Additional filtering, such as smoothing via smoothing filter 44 to remove quantization noise or other artifacts, may be applied to a predicted block on an adaptive basis in a second filter mode, along with regular motion compensation. The additional filtering may be achieved by applying an additional filter after a regular motion compensation filter, or by applying a different filter that combines both regular motion compensation and additional filtering, such as smoothing. In the example of FIG. 4, however, the additional filtering is achieved by applying smoothing filter 44 in conjunction with motion compensation unit 42, e.g., on a cascaded basis.

As described above, motion compensation module 30 may adaptively apply either a first filter mode or a second filter mode based on a filter mode signal provided with the encoded digital video. In some cases, the filter mode signal may be an encoded signal such as, for example, a smoothed-reference flag as specified in Joint Draft 7 (JD7). In this manner, video decoder 26A may make a filter mode decision as directed by video encoder 20. Alternatively, video decoder 26 may analyze characteristics of the encoded digital video to determine whether the additional filtering mode should be applied.

The first filter mode may involve regular motion compensation, e.g., with any necessary interpolation filters, while the second filter mode involves regular motion compensation plus additional filtering, such as smoothing. As examples, interpolation may be applied using a 2-tap filter, and smoothing may be applied by using a 3-tap filter. If the second filter mode is indicated (74), motion compensation module 30 applies the additional filter to the predicted block (76). Notably, the filter mode decision may be made on a block-by-block basis, where the term "block" may refer to a macroblock or smaller block, such as a subblock. Alternatively, the filter mode decision may be made at the frame- or slice-level, and applied to all blocks within a given frame or slice, as applicable. If the second filter mode is not indicated (74), the additional filtering is not applied, thereby saving processing complexity for some blocks in the case of block-by-block adaptive motion compensation.

After either regular motion compensation (72) or motion compensation plus additional filtering (76), video decoder 26A sums the predicted block with residual data provided in the encoded digital video (78) and forms a decoded block based on the sum (80). In instances where the video decoder conforms to the SVC extension of H.264/AVC, e.g., such as a video decoder similar to video decoder 26C of FIG. 6 or video decoder 26D of FIG. 10, the video decoder may further include the functionality of a switch 54 that provides the base layer residual for summation (e.g., as indicated by S1). In this case, motion compensation is applied to blocks in an enhancement layer of an SVC frame. Video decoder 26C, in these instances, may sum the base layer residual with the predicted block and the residual data provided in the encoded digital video (78) to form a decoded block based on the sum (80). In either instance, the sum may be processed by a deblocking filter 38 to remove blocking artifacts. The decoded blocks may be used to form a video frame to drive display device 28, and may be added to a reference frame store to form reference frames for decoding of subsequent frames. By applying additional filtering at the block-level, the decoded digital video may exhibit enhanced coding efficiency. By applying the additional filtering on an adaptive basis rather than full-time, however, video decoder 26C may achieve significant performance gains without excessive processing complexity.

Figure 12:
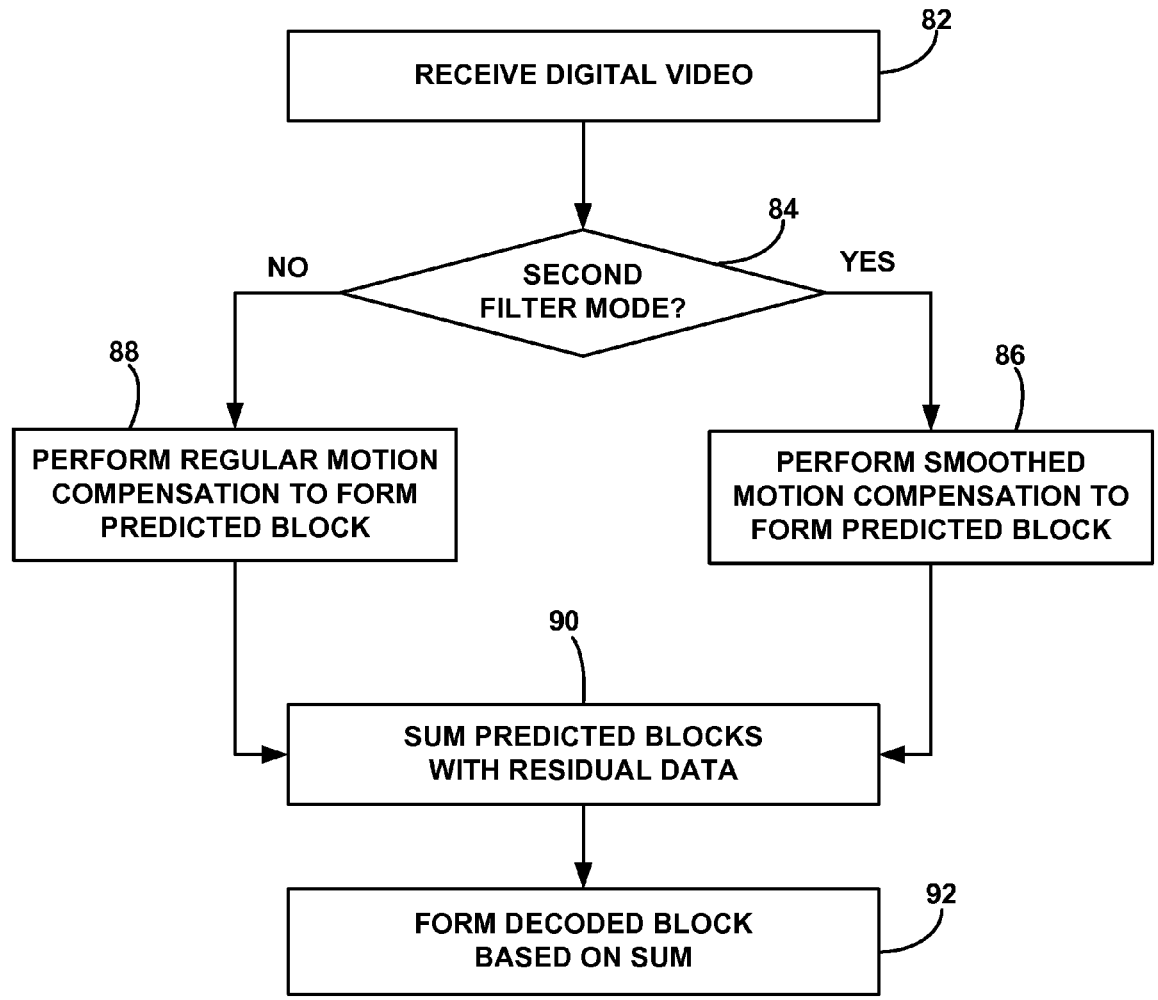
FIG. 12 is a flow diagram illustrating exemplary operation of the video decoder in performing smoothing and motion compensation using a combined smoothed motion compensation unit at the block level of inter-coded frames.

FIG. 12 is a flow diagram illustrating exemplary operation of the video decoder 26B of FIG. 5 in performing smoothing and motion compensation using a combined smoothed motion compensation unit. The process shown in FIG. 12 may be adapted for application to SVC coding. As shown in FIG. 12, upon receiving digital video (82) via channel 16, a video encoder 26B (FIG. 5) or video decoder 26C (FIG. 6) determines whether a second filter mode is indicated (84). Again, the second filter mode may be indicated by a filter mode signal included in the encoded video bitstream. The second filter mode may be indicated on a frame-, slice-, macroblock- or subblock-basis. Alternatively, video decoder 26B may be configured to determine whether the second filter mode should be applied based on analysis of one or more characteristics of the digital video.

If the second filter mode is indicated (84), motion compensation module 30 performs a combined smoothing and regular motion compensation, i.e., smoothed motion compensation, to form a predicted block (86). Smoothed motion compensation may be performed via smoothed motion compensation filter 52 (FIG. 5 or 6) of motion compensation module 30 in FIG. 5. If the second filter mode is not indicated (84), motion compensation module 30 performs regular motion compensation to form the predicted block (88), e.g., via motion compensation unit 42 of motion compensation module 30, without additional filtering. Video decoder 26B of 26C then sums the predicted block with residual data (90) and forms a decoded block based on the sum (92).

Again, in instances where the video decoder conforms to the SVC extension of H.264/AVC, e.g., similar to video decoder 26C of FIG. 6 or video decoder 26D of FIG. 10, the video decoder may further include the functionality of a switch 54 that provides the base layer residual for summation. In this case, motion compensation is applied to blocks in an enhancement layer of an SVC frame. The video decoder, in these instances, may sum the base layer residual with the predicted block and the residual data provided in the encoded digital video (90) to form a decoded block based on the sum (92). In either instance, the sum may be processed by a deblocking filter 38 to remove blocking artifacts. The decoded blocks may be used to form a video frame to drive display device 28, and may be added to a reference frame store to form reference frames for decoding of subsequent frames.

FIG. 12 illustrates the use of a combined smoothed motion compensation unit 52 that combines smoothing with regular motion compensation in a single filter module, instead of applying regular motion compensation and smoothing as separate filtering operations in a cascaded manner. In this way, in the example of FIG. 12, by combining regular motion compensation and smoothing, processing complexity can be reduced. This process may continue over the blocks in each frame, and over the multiple frames and slices associated with a video sequence. Again, the filter mode decision of whether to apply smoothed motion compensation unit 52 or regular motion compensation unit 42 may be determined on a frame-by-frame, slice-by-slice, macroblock-by-macroblock, or block-by-block basis.

Figure 13:
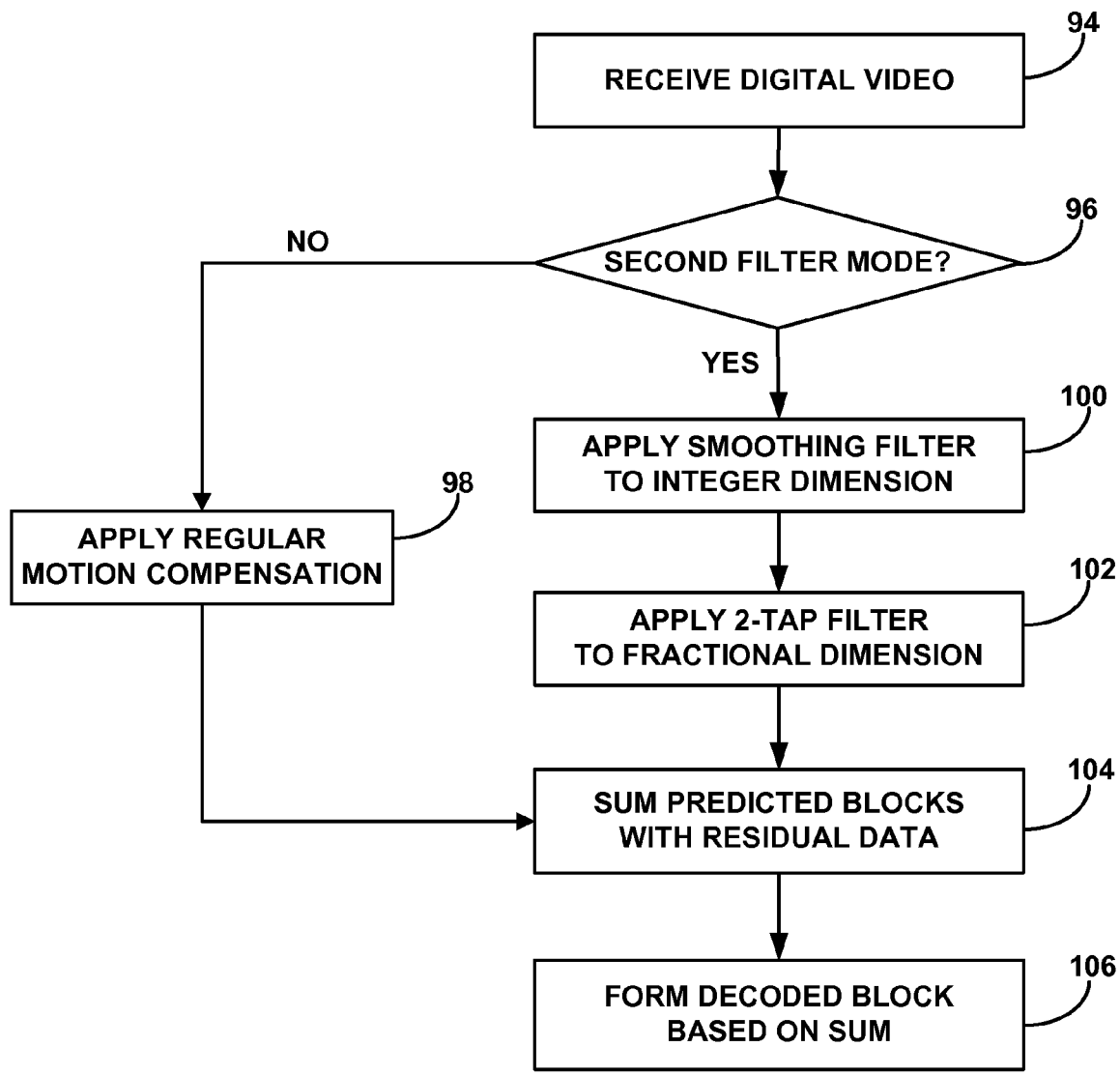
FIG. 13 is a flow diagram illustrating exemplary operation of a video decoder in performing adaptive motion compensation with different filters in the vertical and horizontal dimensions.

FIG. 13 is a flow diagram illustrating exemplary operation of the video decoder 26D of FIG. 10 in performing adaptive motion compensation with different filters in the vertical and horizontal dimensions. In the example of FIG. 13, video decoder 26D applies an adaptive filter mode, similar to FIG. 12. In particular, motion compensation module 30 may apply regular motion compensation unit 42 in a first filter mode. In a second filter mode, motion compensation module 30 may apply a smoothed motion compensation filter 52, which combines regular motion compensation and additional filtering, such as smoothing. As shown in FIG. 10, however, application of smoothed motion compensation filter 52 may further involve application of different filters 56, 58 in the horizontal and vertical dimensions. Upon receiving digital video (94), video decoder 26 determines whether a second filter mode is indicated (96). If the second filter mode is not indicated, motion compensation module 30 applies regular motion compensation (98), e.g., via motion compensation unit 42 (FIG. 10). If the second filter mode is indicated (96), motion compensation module 30 may apply smoothed motion compensation filter 52, in effect providing both regular motion compensation and additional filtering.

The additional filtering may be provided by a smoothing filter such as a 3-tap filter applied by smoothed motion compensation unit 52 in a dimension in which the pertinent motion vector points to an integer pixel location (100), i.e., in the integer dimension. In addition, smoothed motion compensation unit 52 may apply an interpolation filter, e.g., a 2-tap filter such as a bilinear filter, in a dimension of the prediction block in which the pertinent motion vector points to a fractional pixel location (102), i.e., a fractional dimension. Hence, smoothed motion compensation unit 52 may apply different filters in different dimensions when the second filter mode is indicated. If the second filter mode is not indicated (96), the regular motion compensation is applied instead (98).

In either case, the video decoder sums the predicted block with applicable residual data (104) and forms a decoded block based on the sum (106). As discussed previously, in instances where the video decoder conforms to the SVC extension of H.264/AVC, e.g., similar to video decoder 26D of FIG. 10, video decoder 26D further may include the functionality of a switch 54 that provides the base layer residual for summation. In this case, motion compensation is applied to blocks in an enhancement layer of an SVC frame. Video decoder 26D, in these instances, may sum the base layer residual with the predicted block and the residual data provided in the encoded digital video (104) to form a decoded block based on the sum (106). In either instance, the sum may be processed by a deblocking filter 38 to remove blocking artifacts. The decoded blocks may be used to form a video frame to drive display device 28, and may be added to a reference frame store to form reference frames for decoding of subsequent frames. As described above, smoothed motion compensation filter 52 effectively applies both motion compensation and smoothing operations, thus reducing the complexity relative to independent application of each operation in a cascaded manner. In addition, smooth motion compensation filter 52 is configured to adaptively apply different filters in the horizontal and vertical dimensions depending on the applicable motion vector.

Any device described in this disclosure may represent various types of devices, such as a wireless phone, a cellular phone, a laptop computer, a wireless multimedia device, a wireless communication personal computer (PC) card, a personal digital assistant (PDA), an external or internal modem, a gaming device, or any device that communicates through a wireless or wired channel. Such a device may have various names, such as access terminal (AT), access unit, subscriber unit, mobile station, mobile device, mobile unit, mobile phone, mobile, remote station, remote terminal, remote unit, user device, user equipment, handheld device, or the like. In one aspect, a device as described in this disclosure may be or form part of a wireless communication device handset.

The techniques described herein may be implemented in hardware, software, firmware, or any combination thereof. If implemented in software, the techniques may be realized at least in part by one or more stored or transmitted instructions or code on a computer-readable medium. Computer-readable media may include computer storage media, communication media, or both, and may include any medium that facilitates transfer of a computer program from one place to another. A storage media may be any available media that can be accessed by a computer.

By way of example, and not limitation, such computer-readable media can comprise a data storage medium such as RAM, such as synchronous dynamic random access memory (SDRAM), read-only memory (ROM), non-volatile random access memory (NVRAM), ROM, electrically erasable programmable read-only memory (EEPROM), EEPROM, FLASH memory, CD-ROM or other optical disk storage, magnetic disk storage or other magnetic storage devices, or any other computer-readable data storage medium that can be used to carry or store desired program code in the form of instructions or data structures and that can be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically, e.g., with lasers. Combinations of the above should also be considered computer-readable media.

The code associated with a computer-readable medium of a computer program product may be executed by a computer, e.g., by one or more processors, such as one or more digital signal processors (DSPs), general purpose microprocessors, application specific integrated circuits (ASICs), field programmable logic arrays (FPGAs), or other equivalent integrated or discrete logic circuitry. In some aspects, the functionality described herein may be provided within dedicated software modules or hardware modules configured for encoding and decoding, or incorporated in a combined video encoder-decoder (CODEC). Hence, the disclosure contemplates an integrated circuit device configured to implement the techniques described in this disclosure. Such integrated circuit devices may have a variety of applications, including use within wireless communication device handsets.

Various aspects of the disclosure have been described. These and other aspects are within the scope of the following claims.

The invention claimed is:

1. A method for coding a block within a video frame, the method comprising:
generating a filter mode decision, the filter mode decision indicating either a first filter mode or a second filter mode;
applying, by a video coder, motion compensation to the block to generate a prediction video block, wherein the motion compensation applied to the block is adaptively adjusted to apply either the first filter mode or the second filter mode to the block based on the filter mode decision, the video coder applying a motion compensation filter to the block when the filter mode decision indicates the first filter mode, the video coder applying the motion compensation filter and a smoothing filter to the block when the filter mode decision indicates the second filter mode, the video coder not applying the smoothing filter to the block when the filter mode decision indicates the first filter mode; and
combining the prediction video block with a corresponding residual block after generating the prediction video block,
wherein generating the filter mode decision is based upon statistics of the block within the video frame, and wherein the motion compensation is adaptively adjusted by selecting a basis from either a block-by-block basis and a non-block-by-block basis.

2. The method of claim 1, further comprising applying a 3-tap filter to the block when the filter mode decision indicates the second filter mode and a motion vector associated with the block points to an integer pixel location.

3. The method of claim 1, wherein generating the filter mode decision comprises generating the filter mode decision based on one of: a signal encoded in the video bitstream or one or more characteristics of the video frame.

4. The method of claim 1, wherein the block is in an enhancement layer of a scalable video coding frame.

5. The method of claim 1, wherein the video coder applies the motion compensation filter to the block when the filter mode decision indicates the first filter mode, and applies a 3-tap filter to the block when the filter mode decision indicates the second filter mode.

6. The method of claim 5, further comprising applying the 3-tap filter and the motion compensation filter when the filter mode decision indicates the second filter mode, wherein the motion compensation filter includes a 2-tap filter.

7. The method of claim 5, further comprising applying a filter that combines the 3-tap filter with an interpolation filter when the filter mode decision indicates the second filter mode.

8. The method of claim 7,
wherein the interpolation filter includes a 2-tap filter, and wherein the method further comprises:
when the filter mode decision indicates the second filter mode, applying the 3-tap filter in one of a horizontal dimension and a vertical dimension, and
applying the 2-tap filter in another of the horizontal and vertical dimensions.

9. The method of claim 7,
wherein the interpolation filter includes a 2-tap filter, and wherein the method further comprises, when the filter mode decision indicates the second filter mode:
applying the 3-tap filter in the horizontal dimension and applying the 2-tap filter in the vertical dimension when a motion vector points to an integer pixel location in the horizontal dimension and to a fractional pixel location in the vertical dimension; and
applying the 3-tap filter in the vertical dimension and applying the 2-tap filter in the horizontal dimension when a motion vector points to an integer pixel location in the vertical dimension and to a fractional pixel location in the horizontal dimension.

10. The method of claim 1, wherein the non-block-by-block basis is selected from the group consisting of a macroblock-by-macroblock basis, a slice-by-slice basis, and a frame-by-frame basis.

11. A video coding device comprising:
a control module that generates a filter mode decision, the filter mode decision indicating either a first filter mode or a second filter mode;
a motion compensation module that applies motion compensation to a block within a video frame to generate a prediction video block, wherein the motion compensation is adaptively adjusted to apply either the first filter mode or the second filter mode to the block based on the filter mode decision, the motion compensation module applying a motion compensation filter to the block when the filter mode decision indicates the first filter mode, the motion compensation module applying the motion compensation filter and a smoothing filter to the block when the filter mode decision indicates the second filter mode, the motion compensation module not applying the smoothing filter to the block when the filter mode decision indicates the first filter mode; and
a summer that combines the prediction video block with a corresponding residual block after generating the prediction video block,
wherein generating the filter mode decision is based upon statistics of the block within the video frame, and wherein the motion compensation is adaptively adjusted by selecting a basis from either a block-by-block basis and a non-block-by-block basis.

12. The device of claim 11, wherein the motion compensation module applies a 3-tap filter to the block when the filter mode decision indicates the second filter mode and a motion vector associated with the block points to an integer pixel location.

13. The device of claim 11, wherein the control module generates the filter mode decision based on one of: a signal encoded in the video bitstream or one or more characteristics of the video frame.

14. The device of claim 11, wherein the block is in an enhancement layer of a scalable video coding frame.

15. The device of claim 11, wherein the motion compensation module applies the motion compensation filter when the filter mode decision indicates the first filter mode, and applies a 3-tap filter when the filter mode decision indicates the second filter mode.

16. The device of claim 15, wherein the motion compensation module applies the 3-tap filter and the motion compensation filter when the filter mode decision indicates the second filter mode, wherein the motion compensation filter includes a 2-tap filter.

17. The device of claim 15, wherein the motion compensation module applies a filter that combines the 3-tap filter with an interpolation filter when the filter mode decision indicates the second filter mode.

18. The device of claim 17,
wherein the interpolation filter includes a 2-tap filter, and wherein the motion compensation module applies the 3-tap filter in one of a horizontal dimension and a vertical dimension when the filter mode decision indicates the second filter mode, and applies the 2-tap filter in another of the horizontal and vertical dimensions.

19. The device of claim 17,
wherein the interpolation filter includes a 2-tap filter, and
wherein when the filter mode decision indicates the second filter mode, the motion compensation module applies the 3-tap filter in the horizontal dimension and the 2-tap filter in the vertical dimension when a motion vector points to an integer pixel location in the horizontal dimension and to a fractional pixel location in the vertical dimension, and applies the 3-tap filter in the vertical dimension and the 2-tap filter in the horizontal dimension when a motion vector points to an integer pixel location in the vertical dimension and to a fractional pixel location in the horizontal dimension.

20. The device of claim 11, wherein non-block-by-block basis is selected from the group consisting of a macroblock-by-macroblock basis, a slice-by-slice basis, and a frame-by-frame basis.

21. The device of claim 11, wherein the device is one of a wireless communication device handset or an integrated circuit device.

22. A video coding device comprising:
means for generating a filter mode decision, the filter mode decision indicating either a first filter mode or a second filter mode;
means for applying motion compensation to a block within a video frame to generate a prediction video block, wherein the motion compensation applied to the block is adaptively adjusted to apply either the first filter mode or the second filter mode to the block based on the filter mode decision, the means for applying motion compensation applying a motion compensation filter to the block when the filter mode decision indicates the first filter mode, the means for applying motion compensation applying the motion compensation filter and a smoothing filter to the block when the filter mode decision indicates the second filter mode, the means for applying motion compensation not applying the smoothing filter to the block when the filter mode decision indicates the first filter mode; and
means for combining the prediction video block with a corresponding residual block after generating the prediction video block,
wherein generating the filter mode decision is based upon statistics of the block within the video frame, and wherein the motion compensation is adaptively adjusted by selecting a basis from either a block-by-block basis and a non-block-by-block basis.

23. The device of claim 22, further comprising means for applying a 3-tap filter to the block for motion vectors that point to integer pixel locations.

24. A computer program product comprising a non-transitory computer-readable medium storing instructions to cause a processor to:
generate a filter mode decision, the filter mode decision indicating either a first filter mode or a second filter mode;
apply motion compensation to a block within a video frame to generate a prediction video block, wherein the motion compensation applied to the block is adaptively adjusted to apply either the first filter mode or the second filter mode to the block based on the filter mode decision, the processor applying a motion compensation filter to the block when the filter mode decision indicates the first filter mode, the processor applying the motion compensation filter and a smoothing filter to the block when the filter mode decision indicates the second filter mode, the processor not applying the smoothing filter to the block when the filter mode decision indicates the first filter mode; and
combine the prediction video block with a corresponding residual block after generating the prediction video block,
wherein generating the filter mode decision is based upon statistics of the block within the video frame, and wherein the motion compensation is adaptively adjusted by selecting a basis from either a block-by-block basis and a non-block-by-block basis.

25. The computer program product of claim 24, further comprising instructions to cause the processor to apply a 3-tap filter to the block for motion vectors that point to integer pixel locations.

* * * * *